(12) United States Patent
Acome et al.

(10) Patent No.: US 12,194,894 B2
(45) Date of Patent: Jan. 14, 2025

(54) HYDRAULICALLY AMPLIFIED SOFT ELECTROSTATIC ACTUATORS FOR AUTOMOTIVE SURFACES AND HUMAN MACHINE INTERFACES

(71) Applicant: Artimus Robotics Inc., Boulder, CO (US)

(72) Inventors: Eric Lucas Acome, Longmont, CO (US); Nicholas Alexander Kellaris, Boulder, CO (US); Shane Karl Mitchell, Boulder, CO (US); Timothy G. Morrissey, Boulder, CO (US)

(73) Assignee: Artimus Robotics Inc., Boulder, CO (US)

( * ) Notice: Subject to any disclaimer, the term of this patent is extended or adjusted under 35 U.S.C. 154(b) by 174 days.

(21) Appl. No.: 18/106,463

(22) Filed: Feb. 6, 2023

(65) Prior Publication Data
US 2023/0278477 A1    Sep. 7, 2023

Related U.S. Application Data

(60) Provisional application No. 63/310,239, filed on Feb. 15, 2022.

(51) Int. Cl.
*B60N 2/02*    (2006.01)
*A47C 7/14*    (2006.01)
(Continued)

(52) U.S. Cl.
CPC .............. *B60N 2/0224* (2013.01); *A47C 7/14* (2013.01); *A47C 7/142* (2018.08); *A47C 7/144* (2018.08);
(Continued)

(58) Field of Classification Search
None
See application file for complete search history.

(56) References Cited

U.S. PATENT DOCUMENTS 6,006,386 A * 12/1999 Mohaupt .................. G01G 7/06
                                                       73/862.68
8,830,174 B1    9/2014 Rodoper
(Continued)

FOREIGN PATENT DOCUMENTS

WO    2018175741 A1    9/2018
WO    2019173227 A1    9/2019
(Continued)

OTHER PUBLICATIONS

Acome, Eric et al., Hydraulically amplified self-healing electrostatic actuators with muscle-like performance, Science 359, pp. 61-65, (2018), Publ. in: US.
(Continued)

*Primary Examiner* — David E Allred
(74) *Attorney, Agent, or Firm* — Neugeboren O'Dowd PC

(57) ABSTRACT

A seating system includes a seat, with structures for supporting a user thereon, and actuators. Each actuator includes a deformable shell with an enclosed internal cavity containing a fluid dielectric contained, a pair of electrodes disposed on opposing sides of the deformable shell. The actuators are integrated into the structures and configured for providing at least one function, such as haptic feedback, seat adjustment, alert notification, vibratory signal, user input receiving, and massage function. A portion of the plurality of actuators may be enclosed within an encapsulating shell to form an encapsulated sheet of actuators. Each actuator may be a part of a button-on-demand system, wherein the actuator is normally in a collapsed position such that a user-facing surface of the encapsulating shell is substantially flat and, when activated
(Continued)

by a user, the actuator is configured to expand such that the encapsulating shell is raised to form a button.

12 Claims, 32 Drawing Sheets

(51) Int. Cl.
    *A47C 7/46*             (2006.01)
    *B60N 2/90*            (2018.01)

(52) U.S. Cl.
    CPC .............. *A47C 7/462* (2013.01); *A47C 7/467* (2013.01); *B60N 2/0244* (2013.01); *B60N 2/026* (2023.08); *B60N 2/976* (2018.02); *B60N 2002/981* (2018.02)

(56) References Cited

U.S. PATENT DOCUMENTS

| | | | |
|---|---|---|---|
| 10,995,779 | B2 | 5/2021 | Keplinger et al. |
| 11,408,452 | B2 | 8/2022 | Keplinger et al. |
| 11,486,421 | B2 | 11/2022 | Keplinger et al. |
| 11,635,094 | B2 | 4/2023 | Keplinger et al. |
| 11,795,979 | B2 | 10/2023 | Keplinger et al. |
| 11,827,459 | B2 | 11/2023 | Morrissey et al. |
| 2007/0263293 | A1* | 11/2007 | Batchko ............... G02B 26/004 359/666 |
| 2012/0228991 | A1* | 9/2012 | Vranish .................. B25J 9/1075 310/300 |
| 2014/0333591 | A1 | 11/2014 | Bell et al. |
| 2015/0201918 | A1 | 7/2015 | Kumar et al. |
| 2018/0105274 | A1 | 4/2018 | Udriste et al. |
| 2022/0015971 | A1 | 1/2022 | Rowe et al. |
| 2022/0017005 | A1 | 1/2022 | Rowe et al. |
| 2022/0096321 | A1* | 3/2022 | Beard .................. A61H 31/007 |
| 2022/0158570 | A1 | 5/2022 | Keplinger et al. |
| 2022/0178414 | A1* | 6/2022 | Herzog ................. F16D 55/226 |
| 2022/0232903 | A1 | 7/2022 | Rutledge et al. |
| 2022/0316466 | A1 | 10/2022 | Mitchell et al. |
| 2023/0091400 | A1 | 3/2023 | Acome et al. |
| 2023/0149186 | A1* | 5/2023 | Herzog .................. H02N 1/006 623/14.13 |
| 2023/0200250 | A1 | 6/2023 | Correll et al. |
| 2023/0258203 | A1 | 8/2023 | Keplinger et al. |
| 2023/0260735 | A1* | 8/2023 | Im .......................... G06F 3/016 361/211 |
| 2023/0278477 | A1 | 9/2023 | Acome et al. |
| 2023/0340970 | A1 | 10/2023 | Acome et al. |
| 2024/0313669 | A1* | 9/2024 | Kyung .................. H02N 1/008 |

FOREIGN PATENT DOCUMENTS

| | | |
|---|---|---|
| WO | 2020180982 | 9/2020 |
| WO | 2020180986 A1 | 9/2020 |
| WO | 2021030742 A1 | 2/2021 |
| WO | 2022050997 A2 | 3/2022 |
| WO | 2023158568 A1 | 8/2023 |

OTHER PUBLICATIONS

Kellaris, Nicholas et al., "An analytical model for the design of Peano-HASEL actuators with drastically improved performance", Extreme Mechanics Letters, 29, (2019), 100449, published by Elsevier Ltd., 10 pages, Publ. in: US.

Kellaris, Nicholas et al., Peano-HASEL actuators: Muscle-mimetic, electrohydraulic transducers that linearly contract on activation, Sci. Robot. 3, eaar 3276, (2018), 11 pages, Publ. in: US.

Mitchell, et al.; An Easy-to-Implement Toolkit to Create Versatile and High-Performance HASEL Actuators for Untethered Soft Robots; Adv. Sci.; 2019, 6, 1900178, 15 pages, Publ. in: US.

Rothemund, et al.; Dynamics of electrohydraulic soft actuators; PNAS; vol. 117; No. 28; Jul. 14, 2020; pp. 16207-16213, Publ. in: US.

Wang et al.; High-strain Peano-HASEL actuators; doi:10.1002/adfm.201908821; Dec. 15, 2019, 24 pages, Publ. in: US.

Wang, Xingrui et al., "High-Strain Peano-HASEL Actuators", Adv. Funct. Mater., 2020, 30, 1908821, 9 pages, Publ. in: US.

Matos, Taina, "International Search Report and Written Opinion of the International Searching Authority for PCT Application No. PCT/US2023/012450," Mailing Date Apr. 14, 2023, 15 Pages; Publ. in US.

IB/WIPO, "International Preliminary Report on Patentability regarding International Patent Application No. PCT/US2023/012450," issued Aug. 20, 2024, mailed Aug. 29, 2024, 14 pages, Publ. in: CH.

\* cited by examiner

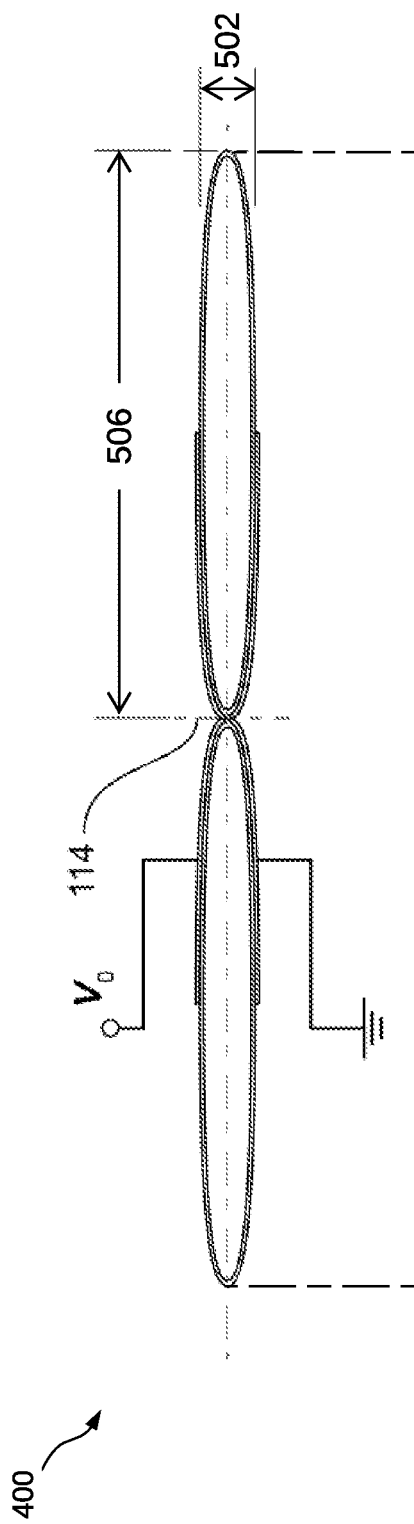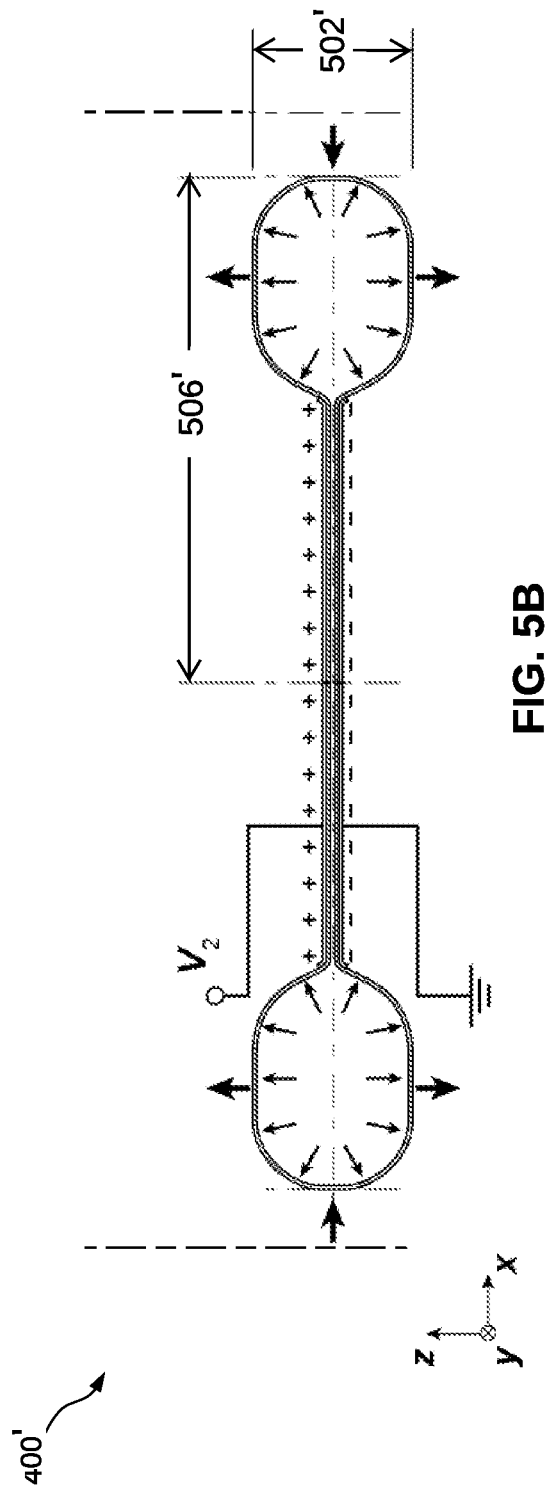
FIG. 5A
FIG. 5B

HYDRAULICALLY AMPLIFIED SOFT ELECTROSTATIC ACTUATORS FOR AUTOMOTIVE SURFACES AND HUMAN MACHINE INTERFACES

CROSS-REFERENCE TO RELATED APPLICATIONS

The present disclosure claims priority to U.S. Provisional Patent App. No. 63/310,239 titled "HYDRAULICALLY AMPLIFIED SOFT ELECTROSTATIC ACTUATORS FOR AUTOMOTIVE SURFACES AND HUMAN MACHINE INTERFACES" filed on Feb. 15, 2022. This disclosure also relates to PCT Publication No. WO 2018/175741 titled "HYDRAULICALLY AMPLIFIED SELF-HEALING ELECTROSTATIC TRANSDUCERS" filed on Mar. 22, 2018; PCT Application No. PCT/US2019/020568 titled "HYDRAULICALLY AMPLIFIED SELF-HEALING ELECTROSTATIC TRANSDUCERS HARNESSING ZIPPING MECHANISM" filed on Mar. 4, 2019; PCT Application No. PCT/US20/20986 titled "FOLDABLE FILLING FABRICATION AND COMPOSITE LAYERING OF HYDRAULICALLY AMPLIFIED SELF-HEALING ELECTROSTATIC TRANSDUCERS" filed on Mar. 4, 2020; PCT Application No. PCT/US20/20978 titled "COMPOSITE LAYERING OF HYDRAULICALLY AMPLIFIED SELF-HEALING ELECTROSTATIC TRANSDUCERS" filed on Mar. 4, 2020; and U.S. Provisional Patent App. 63/032,209 titled "CAPACITIVE SELF-SENSING FOR ELECTROSTATIC TRANSDUCERS WITH HIGH VOLTAGE ISOLATION" filed on May 29, 2020; and PCT Application No. PCT/US2020/046494 titled "HYDRAULICALLY AMPLIFIED SELF-HEALING ELECTROSTATIC (HASEL) PUMPS" filed on Aug. 14, 2020. The entirety of each of the foregoing is incorporated by reference herein.

SPONSORED RESEARCH AND DEVELOPMENT

This invention was made with Government support under contract 80NSSC22CA093 awarded by NASA. The Government has certain rights in this invention.

FIELD OF THE INVENTION

The present invention relates to actuator systems. In particular, but not by way of limitation, the present invention relates to soft actuator systems suitable for use with surfaces and interfaces in automotive applications and other human machine interfaces.

DESCRIPTION OF RELATED ART

Human-machine interfaces are important parts of everyday life. While most interfaces, such as LCD displays, provide visual feedback, there are many opportunities for interfaces that provide physical or tactile feedback and stimulation. Tactile feedback can be used to communicate information to users or provide alerts. New tactile interfaces can be beneficial for environments where users have to process a large amount of sensory input, such as driving an automobile through heavy traffic and/or poor conditions. Besides communicating information, tactile stimulation can be useful for improving user experience and comfort. Examples include chairs with massage function or vibration that is synchronized with a sound system.

Modern automotive seats often include motorized or pneumatic actuators for adjusting driver or passenger position. Additionally, some seats even include massage systems for user comfort. Actuators used for these systems are typically powered by electric motors or pneumatic bladders. Systems based on electric motors require several moving mechanical parts which can be complex. Similarly, pneumatic systems require pumps and valves which add to overall system size and complexity.

Most haptic actuators today are either eccentric rotating motors (ERMs), linear resonant actuators (LRAs), or voice coils actuators (VCAs). While these actuators are great for providing vibrations in the 100-300 Hz range, most haptic devices today transmit information by buzzing at different frequencies, durations, and intensity.

However, most of our physical interactions-such as clicking a button, grasping an object, or embracing a loved one-occur at much lower frequencies and are not adequately represented by the buzzing of traditional haptic actuators. In fact, important nerve endings known as Meissner corpuscles are the most sensitive to motion within the range of 10-50 Hz. Additionally, slowly adapting (SA) mechanoreceptors are responsive to frequencies as low as 0.4 Hz and are important for perceiving shapes and direction of motion along the skin. Sensations on these low frequencies can be imitated with various tricks using traditional haptic actuators, but the effect is a poor representation of reality.

Furthermore, ERMs, LRAs, and VCAs are all actuated by electromagnetic forces. As a result, they are made from a variety of rigid materials and require several moveable parts. Besides added complexity, these factors make it difficult to integrate electromagnetic actuators into devices such as wearables that need to be comfortable and unobtrusive for a user. Additionally, due to the mechanical impedance mismatch of stiff rigid materials and soft human tissue, the transfer of energy from an electromagnetic actuator to a user is inefficient.

Improved actuators that may be readily integrated into a variety of human-machine interfaces without adding undue complexity while providing heretofore unavailable features would be desirable.

SUMMARY OF THE INVENTION

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

In an embodiment, a seating system includes a seat, in turn including structures for supporting a user thereon, and a plurality of actuators. Each actuator includes a deformable shell defining an enclosed internal cavity, a fluid dielectric contained within the enclosed internal cavity, a first electrode disposed on a first side of the deformable shell, and a second electrode disposed on a second, opposing side of the deformable shell. The plurality of actuators are integrated into the structures of the seat, and the plurality of actuators are configured for providing at least one function, the function including haptic feedback, seat adjustment, alert notification, vibratory signal, user input receiving, and massage function.

In certain embodiments, a portion of the plurality of actuators are enclosed within an encapsulating shell to form an encapsulated sheet of actuators. For example, the encapsulating shell may be formed of a material providing at least one of electrical insulation, thermal insulation, electrical isolation between neighboring actuators contained within the encapsulating shell, and cushioning.

In other embodiments, at least one of the actuators enclosed within the encapsulating shell is configured to operate as a button on demand. The at least one of the actuators enclosed within the encapsulating shell is normally in a collapsed position such that a user-facing surface of the encapsulated sheet of actuators is substantially flat. When activated by a user, the at least one of the actuators within the encapsulating shell may be configured to expand such that a portion of the user-facing surface of the encapsulated sheet of actuators is raised to form a button.

In certain embodiments, the at least one of the actuators within the encapsulating shell is configured to be activatable when touched by the user. In other embodiments, the encapsulating sheet of actuators further contains at least one proximity sensor, and the at least one of the actuators within the encapsulating shell is in electrical communication with the at least one proximity sensor such that the at least one of the actuators within the encapsulating shell is activatable when the at least one proximity sensor senses the user within a predetermined distance from the encapsulated sheet of actuators.

In a further embodiment, the seating system includes a control system electrically coupled with the plurality of actuators for controlling the at least one function.

In another embodiment, a seating system includes a seat including structures, for supporting a user thereon, and a plurality of actuators. Each actuator includes a deformable shell defining an enclosed internal cavity, a fluid dielectric contained within the enclosed internal cavity, a first electrode disposed on a first side of the deformable shell, and a second electrode disposed on a second, opposing side of the deformable shell. The seating system further includes an encapsulating shell enclosing the plurality of actuators therein to form an encapsulated sheet of actuators. The plurality of actuators may be configured for providing at least one function, the function including haptic feedback, seat adjustment, alert notification, vibratory signal, user input receiving, and massage function.

In certain embodiments, the encapsulated sheet of actuators is integrated into the structures of the seat. In other embodiments, the encapsulated sheet of actuators is disposed adjacent to the seat. In an alternative embodiment, the encapsulated sheet of actuators may be affixed on a surface of the seat using at least one of adhesives, tape, belts, hooks, snaps, and hook-and-loop attachments. The seating system may further include a control system electrically coupled with the plurality of actuators for controlling the at least one function.

In another embodiment, a button-on-demand system, includes an actuator. The actuator includes a deformable shell defining an enclosed internal cavity, a fluid dielectric contained within the enclosed internal cavity, a first electrode disposed on a first side of the deformable shell, and a second electrode disposed on a second, opposing side of the deformable shell. The system also includes an encapsulating shell at least partially containing the actuator. In an example, the actuator is normally in a collapsed position such that a user-facing surface of the encapsulating shell is substantially flat and, when activated by a user, the actuator is configured to expand such that a portion of the user-facing surface of the encapsulating shell is raised to form a button.

In an example, the actuator is configured to be activatable when touched by the user. In certain embodiments, the system further includes a proximity sensor. The actuator may be in electrical communication with the proximity sensor such that the actuator is activatable when the proximity sensor senses the user within a predetermined distance from the button-on-demand system.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

The appended drawings illustrate only some implementation and are therefore not to be considered limiting of scope.

FIGS. 5A and 5B illustrate cross-sectional views of a circular HASEL actuator in a rest state and actuated state, in accordance with an embodiment.

Figure 1:
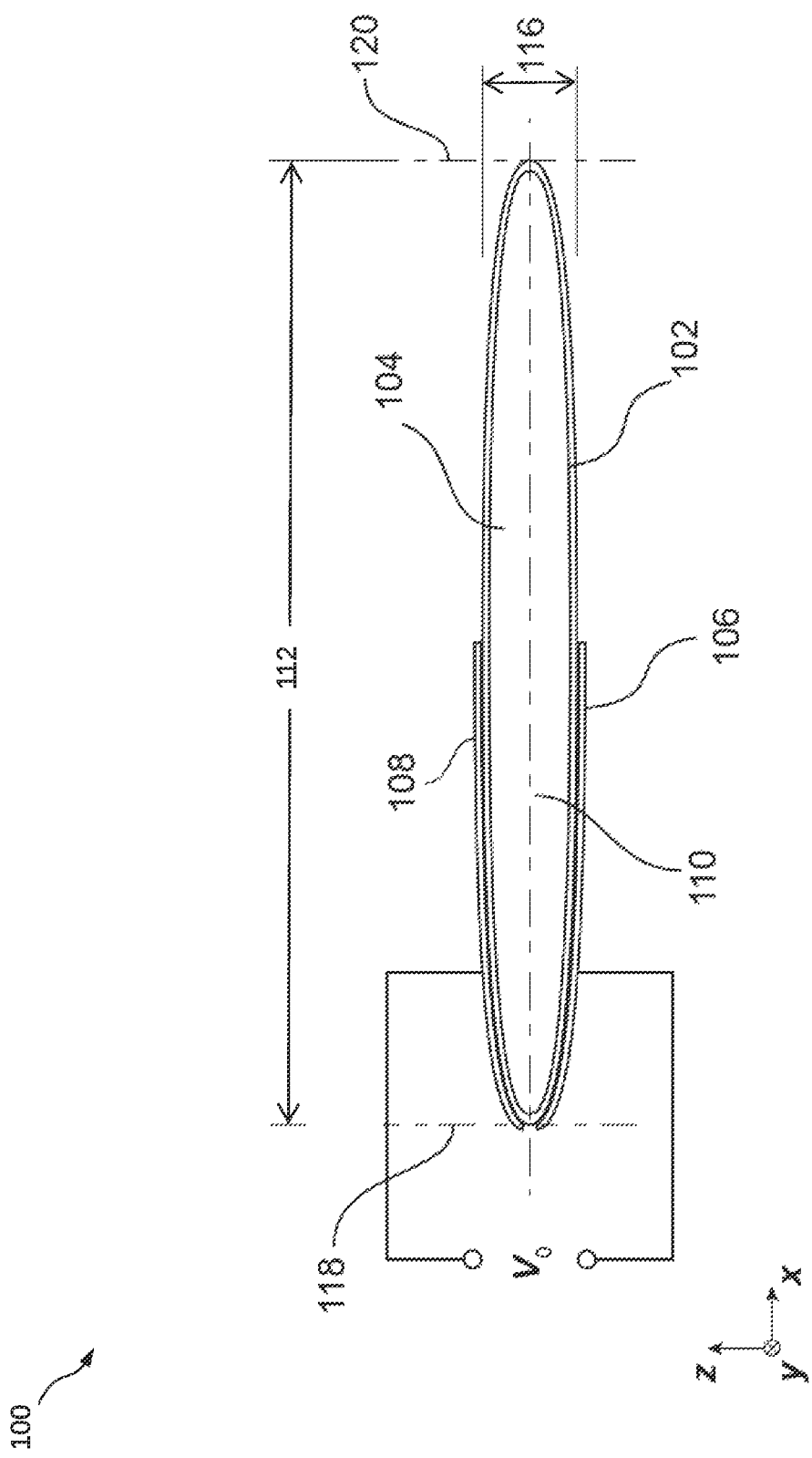
FIG. 1 illustrates a simplified cross section of a hydraulically amplified soft electrostatic (HASEL) actuator at rest, in accordance with an embodiment.

For simplicity and clarity of illustration, the drawing figures illustrate the general manner of construction, and descriptions and details of well-known features and techniques may be omitted to avoid unnecessarily obscuring the embodiments detailed herein. Additionally, elements in the drawing figures are not necessarily drawn to scale. For example, the dimensions of some of the elements in the figures may be exaggerated relative to other elements to help improve understanding of the described embodiments. The same reference numerals in different figures denote the same elements.

The word "exemplary" is used herein to mean "serving as an example, instance, or illustration." Any embodiment described herein as "exemplary" is not necessarily to be construed as preferred or advantageous over other embodiments. In the following detailed description, references are made to the accompanying drawings that form a part hereof, and in which are shown by way of illustrations or specific examples. These aspects may be combined, other aspects may be utilized, and structural changes may be made without departing from the present disclosure. Example aspects may be practiced as methods, systems, or apparatuses. The following detailed description is therefore not to be taken in a limiting sense, and the scope of the present disclosure is defined by the appended claims and their equivalents.

DETAILED DESCRIPTION OF THE INVENTION

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "compromising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

The typical passenger automobile includes several human-machine-interfaces that could benefit from tactile feedback and stimulation. Systems for providing tactile stimulation and feedback using hydraulically amplified soft electrostatic actuators are presented. These include actuators and associated components for integration into various user interfaces. In particular we focus on interfaces found within automobiles and other vehicles although many concepts could be used in other applications involving human-machine-interfaces Here we describe new actuators and systems that utilize hydraulically amplified soft electrostatic (HASEL) actuators for tactile feedback and stimulation. HASEL actuators provide benefits such as direct electrical control which provides very fast response times and simplifies overall system size and complexity. The inherent compliance of HASEL actuators makes them ideal for providing tactile sensations. HASEL actuators can be made into many different sizes and shapes for different user interfaces. Additionally, the self-sensing capability of HASEL actuators can allow for interfaces with dual functionality.

While HASEL actuators operate on relatively high voltages (e.g., 3-6 kV), the actuators may be safely insulated, for example, by encapsulating the actuators within polymers, elastomers, or other materials known in flexible electronics. Further, the operating current is quite low (<<1 mA) such that, if a short were to occur due to failure of the electrical insulation, the total electrical power is well below the threshold for dangerous electrical discharge that may harm a user. In fact, the actuators used in the described embodiments below may be operated with portable power supplies with power ratings as low as 5 W, and may be battery powered. Also, due to the low current requirements, the actuators used in the described embodiments herein consume only a small amount of power. For example, power consumption at 40 Hz has been measured as ranging from 2.0 W at peak (0.4 W root mean square (RMS)) for a single layer actuator to 10.2 W peak (3.8 W RMS) for a 14-actuator stack.

Additionally, with such low power consumption, the actuators used in the embodiments described herein do not generate heat during operation. This characteristic is especially beneficial for applications that are sensitive to temperature or may require a multitude of actuators. Further, as the actuators used in embodiments described herein to not require metal components, the systems and embodiments described below are capable of operating in environments that are sensitive to magnetic fields. Further, the actuators used in embodiments described herein do not require moving, mechanical parts and, consequently, are nearly silent during operation while providing movement and sensations over a wide frequency range (e.g., 0-200 Hz).

It is noted that, in many seating applications including for automotive seating, office chairs, and gaming seats, the seat structure often include a frame covered by foam components and enclosed in a cover. The actuators used in embodiments described herein may be integrated into the foam, positioned between the foam and the cover within the seat structure, integrated into the cover (e.g., sandwiched between material layers forming the cover) and/or placed on the cover as an optional add-on or as an after-market addition by the user.

The systems described here are focused on user interfaces within an automobile, and are applicable for a variety of applications outside of automotive contexts. Actuators incorporated to seats can serve several purposes. Actuators can provide massage sensations or can be configured to provide haptic feedback for hazard detection or notifications from communication devices. Actuators within a seat can also be synchronized with music or entertainment, or activated on demand, for example, for adjusting the seat according to user preferences. Such capabilities are enabled by the soft actuator configurations described herein, which provide wide bandwidth, controllable actuation using soft and flexible materials, offering sensations and actuation beyond simple vibration.

User experience and aesthetics can be improved by incorporating actuators to surfaces that are touched by users. Actuators can be integrated into center consoles, doors, dashboards, and steering wheels to provide tactile information. Compact HASEL actuators can transform a flat surface to a surface with one or more raised segments which function as so-called buttons-on-demand.

While the systems described here are focused on automobiles, they can be readily applied to other vehicles such as airplanes, trains, aircraft, underwater vehicles, etc. Further, these systems can be useful in other situations. Seating for entertainment or work can benefit from tactile actuators. Likewise, tactile sensations can enhance user immersion for virtual reality applications. Many medical situations would benefit from tactile sensations as well. For example, patient beds and seats could utilize HASEL actuators to provide massage and vibration that helps stimulate blood flow and prevent injuries such as bed sores.

FIG. 1 shows an exemplary structure of a HASEL actuator 100. A flexible shell or pouch 102 defines an enclosed internal cavity that is filled with a liquid dielectric 104. Flexible shell 102 may be formed from at least one dielectric material. In an example, flexible shell 102 is formed of a material that is inextensible and/or elastically deformable. A first electrode 106 is disposed over a first side of the enclosed internal cavity and a second electrode 108 is disposed over a second side of the enclosed internal cavity opposite the first side. As shown in FIG. 1, first and second electrodes 106, 108 are placed on opposing sides of flexible shell 102, extending toward the tapered end of the shell, in an example.

In an initial state where applied voltage $V_0$ is null or small, flexible shell 102 may exhibit an initial length 112 and thickness 116.

FIG. 1 illustrates a cross-sectional view of an exemplary, basic HASEL structure. Three-dimensional circular pouch shapes can be formed by revolving this cross-section around an axis at either a left boundary 118 or a right boundary 120, as an example. Likewise, this cross section can be extruded in a direction that is normal to the page to form a rectangular or oval pouch shape. Other pouch shapes may be contemplated based on this basic configuration where part of a flexible shell is covered by a pair of electrodes positioned on opposing sides of the flexible shell.

Figure 8A:
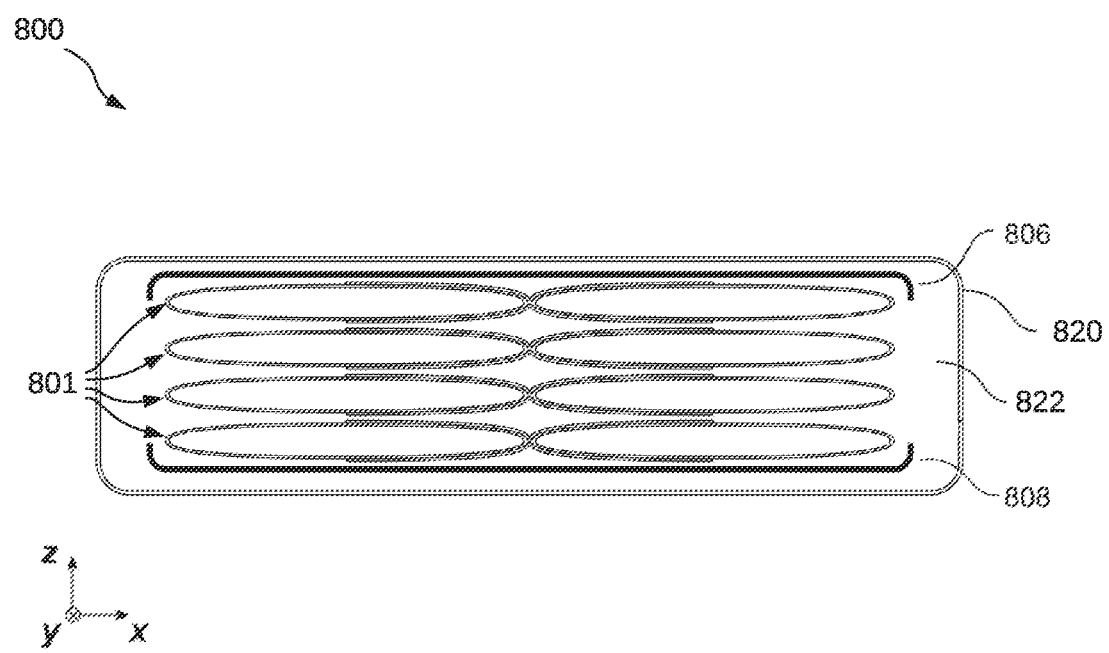
FIGS. 8A and 8B illustrate cross-sectional views of a stack of HASEL actuators contained in an encapsulating pouch, in accordance with an embodiment.
Figure 8B:
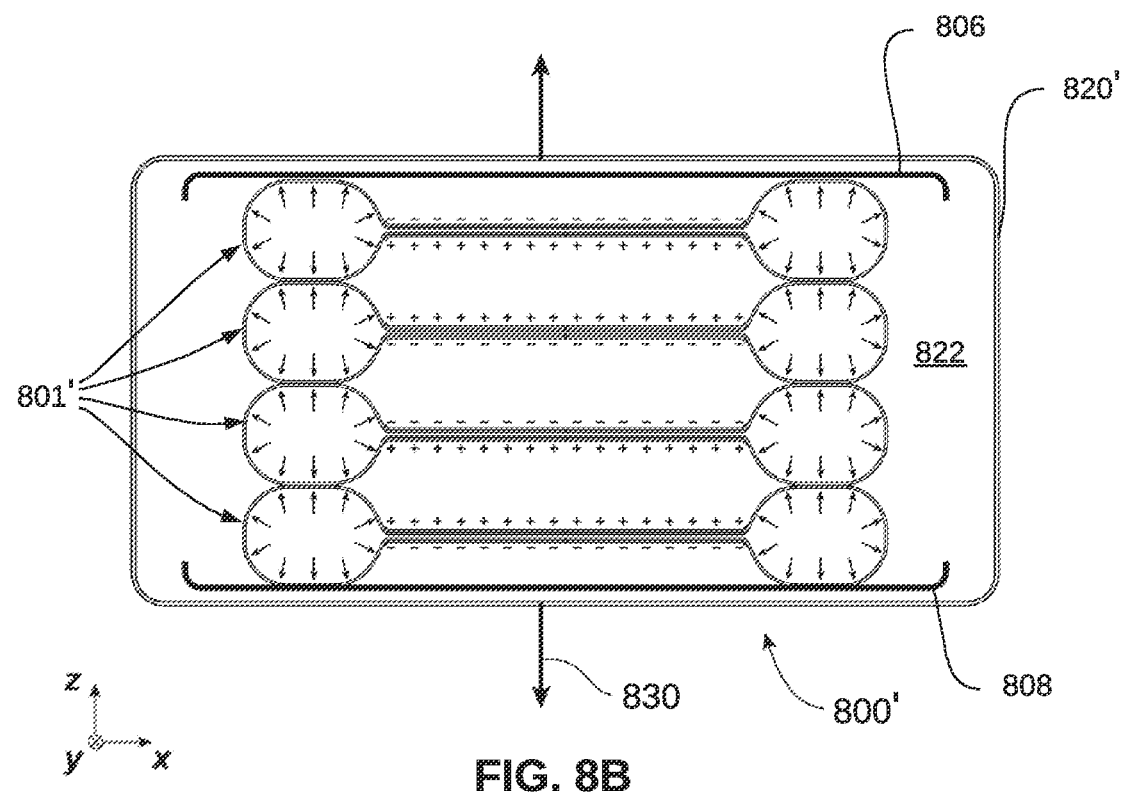

Multiple flexible shells 102 may be positioned adjacent to each other or connected together at either left boundary 118 or right boundary 120 to form a multi-pouch actuator in the horizontal direction (i.e., x or y direction as shown in FIG. 1). Likewise, flexible shells can be stacked in the z direction to create a multi-pouch actuator. In certain examples, a solid plate may be positioned adjacent to the multi-pouch actuator or in between the pouches, such as shown in FIGS. 8A and 8B, as will be described at an appropriate juncture below.

Pouch length 112 may be varied depending on the application and desired performance. For instance, a pouch length ranging from 0.5 mm to 100 mm may be contemplated. As an example, initial thickness 116 may range from 0.1 mm to 10 mm. The length of each one of electrodes 108 and 106 is typically a fraction of pouch length 112 and may range from 10% to 90% of pouch length 112.

Flexible shell 102 may be made from one or more dielectric and non-dielectric layers with various thicknesses. A suitable polymer film for forming flexible shell 102 may include biaxially-oriented films such as polyester, polyethylene terephthalate, and polypropylene. Other films include polyvinylidene fluoride (PVDF), co-polymers, terpolymers (e.g., poly (vinylidene fluoride-trifluoroethylene-chlorotrifluoroethylene) (P(VDF-TrFE-CTFE)), polytetrafluoroethylene (PTFE), and thermoplastic polyurethane (TPU). In certain embodiments, films with a dielectric permittivity greater than 2 and dielectric strength greater than 30 kV/mm may be selected. Films may be doped with nanoparticles such as titanium dioxide, barium titanate, and other semiconductor materials to increase permittivity and therefore increase actuator performance. Thickness of the film forming flexible shell 102 may be less than 50 µm, for example. Flexible shell 102 may be formed of multiple layers of dielectric materials to increase dielectric performance. Additionally, layers for providing improved mechanical performance may be laminated with the dielectric layer of the flexible shell. Flexible shell 102 may be formed from a variety of techniques including heat-sealing, ultra-sonic sealing, adhesives, plasma treatment, laminating, or laser sealing.

Liquid dielectric 104 may include one or more fluids such as natural esters (e.g., FR3® natural ester dielectric fluid from Cargill, Inc.), silicone oils, and mineral oils to name a few. The fluid may be doped with nanoparticles such as titanium dioxide, barium titanate, and other semiconductor materials to increase permittivity and therefore increase actuator performance, in certain embodiments. In some embodiments, liquid dielectric 104 may be a dielectric gas or combination of gas and liquid. Volume of liquid within a pouch generally depends on pouch length and desired thickness and may range from 0.01 mL to 10 mL in each pouch.

Electrodes 106 and 108 may be selected from a number of conductive materials that may be applied by various processes. Electrodes may be flexible and stretchable, or in some cases fully or partially rigid. Possible materials include metallized films that are vacuum deposited onto flexible shell 102, screen-printed conductive inks, conductive elastomers, metals, and conductive polymers.

Figure 2:
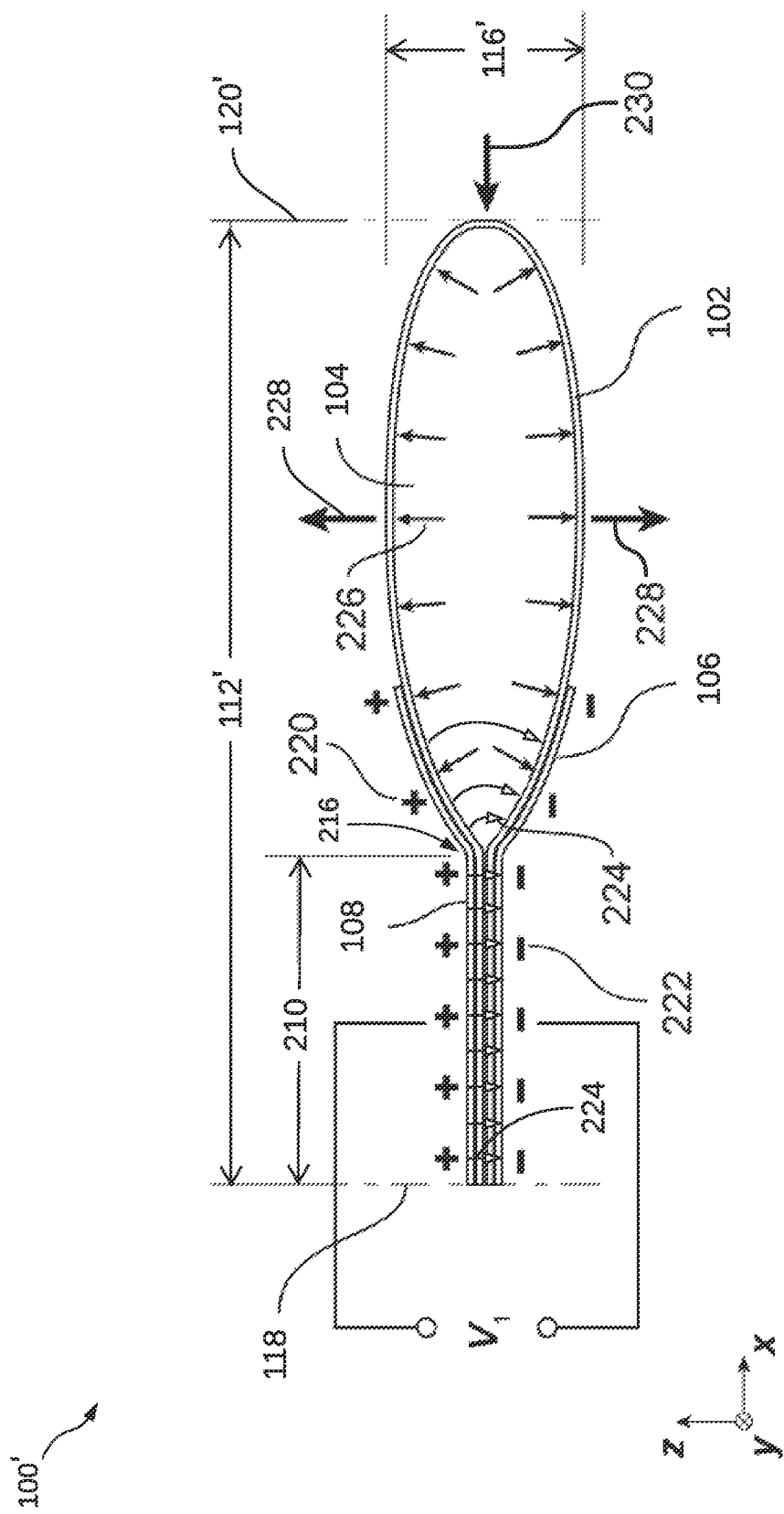
FIG. 2 illustrates a simplified cross section of a HASEL actuator at an intermediate voltage with electrodes partially zipped, in accordance with an embodiment.

FIG. 2 illustrates actuator 100 of FIG. 1 with a voltage $V_1$ applied. Applied voltage $V_1$ causes charges 220, 222 of opposing polarity to flow onto electrodes 106 and 108. Charges 220, 222 act to induce an electric field 224 (represented by white-headed arrows) through flexible shell 102 and liquid dielectric 104. Electric field 224 is generally concentrated through length 210 where the electrodes have zipped together and through liquid dielectric 104 at the edge of a tapered boundary 216 where electrodes 106 and 108 are closest together. This concentration of electric field 224 causes the tapered region to experience a high electrostatic stress and, in response, electrodes 106, 108 zip or move closer together. As the electrodes zip together by a length 210, liquid dielectric 104 is displaced to the portion of flexible shell that has not zipped together. This displacement causes flexible shell 102 to deform such that length 112' decreases and thickness 116' increases. Concurrently, a hydrostatic pressure 226 (indicated by arrows) of liquid dielectric 104 increases. The increased internal hydrostatic pressure 226 combined with the deformation of flexible shell 102 imparts an external force in the vertical and horizontal directions (indicated respectively by thick arrows 228 and 230, respectively). These forces and shape change may be used for performing mechanical work on external objects or surfaces.

Figure 3:
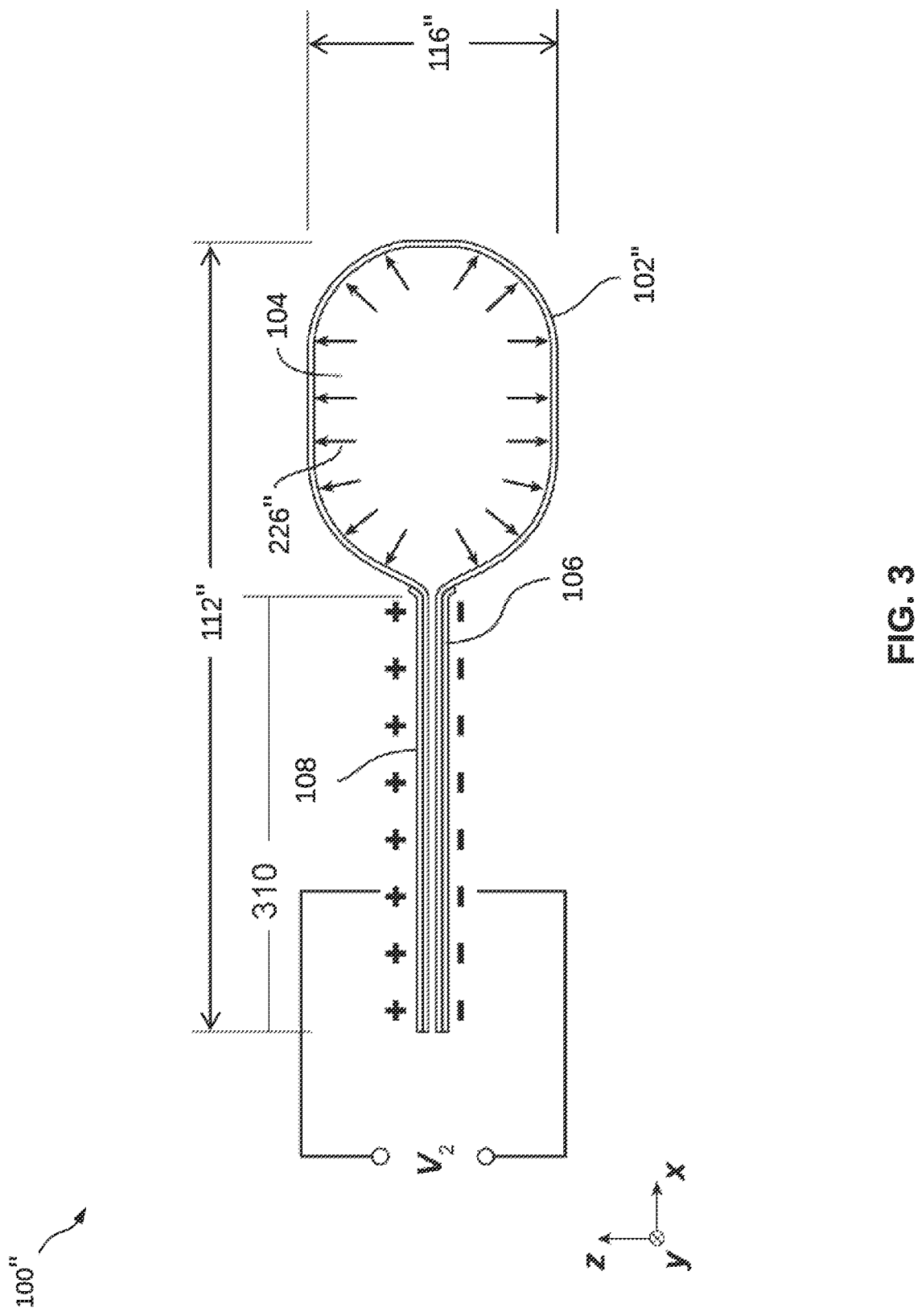
FIG. 3 illustrates a simplified cross section of a HASEL actuator at a maximum voltage with electrodes fully zipped, in accordance with an embodiment.

FIG. 3 illustrates the actuator with voltage $V_2$ applied, which is greater in magnitude than $V_1$ and is sufficient for complete zipping together of the electrodes. In this case, electrodes 106, 108 have fully zipped together. Liquid dielectric 104 contained in flexible shell 102 has been displaced to the portion of the pouch not covered by electrodes, which causes the pouch to further deform and increases the value of hydrostatic pressure 226". Consequently, length 112" is reduced to a minimum value and thickness 116" increases to a maximum value.

Figure 4:
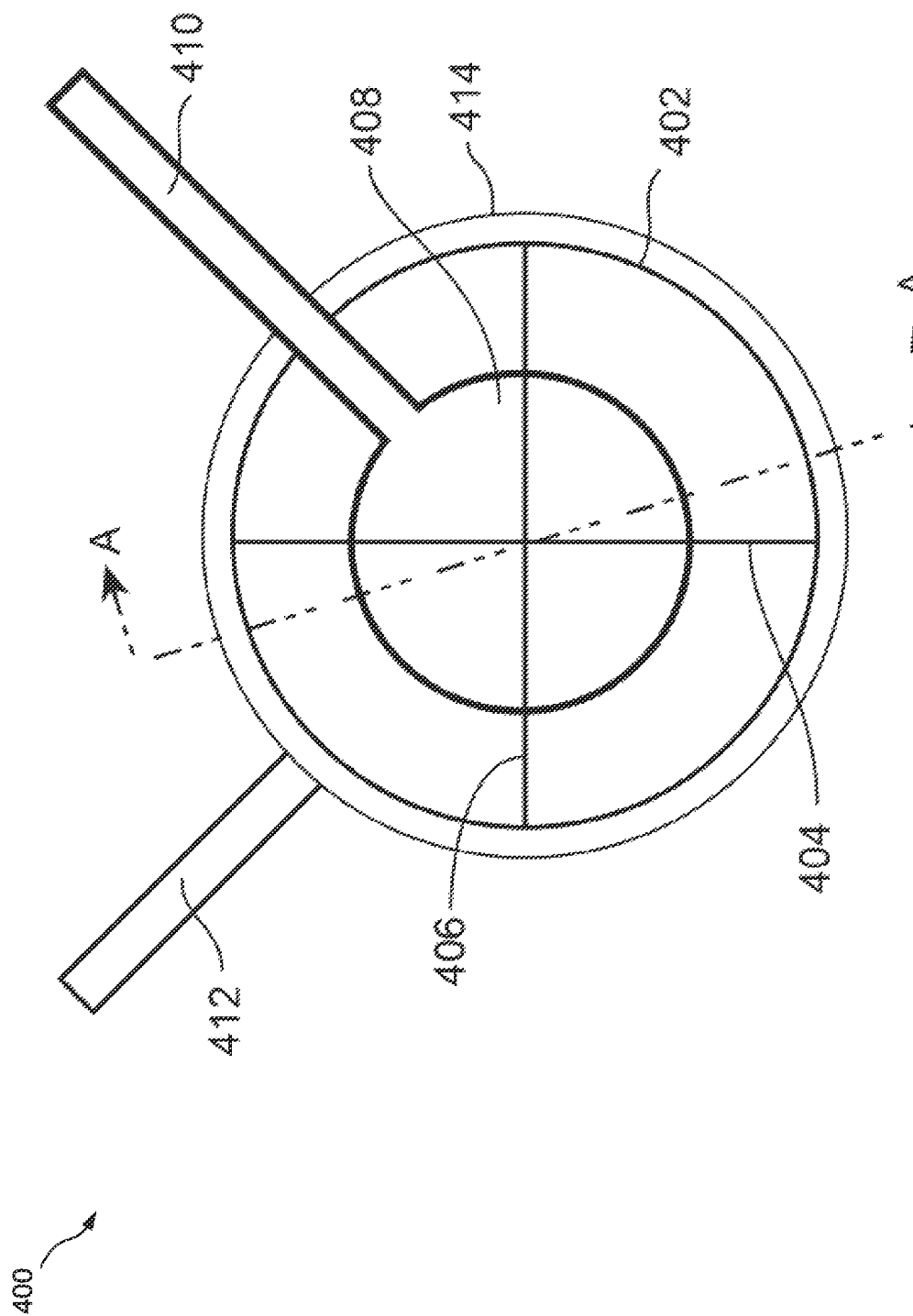
FIG. 4 illustrates a top view of a circular HASEL actuator which expands and contracts upon application of voltage, in accordance with an embodiment.

FIG. 4 shows the top view of a circular HASEL actuator 400, in accordance with an embodiment. Actuator 400 includes a circular pouch 402, which is filled with a dielectric liquid or gas (not visible in FIG. 4) and divided into four sections by a vertical seal 404 and a horizontal seal 406, in the illustrated embodiment. Electrodes 408 are positioned on opposing sides of pouch 402 in or near the middle of the pouch (only the top electrode is visible in FIG. 4). In an example, the electrodes are generally circular and positioned concentrically with circular pouch 402. It should be appreciated that portion of the circular pouch covered with an electrode may be inverted, such that the central part of the pouch is not covered with electrodes (e.g., a circular pouch with "donut"-shaped electrodes disposed concentrically on opposing sides of the pouch). Further, while the electrodes are shown as being generally circular, other shapes, such as semicircular, wedge-shaped, oval, and others, are also contemplated and considered a part of the present disclosure. Connections 410 and 412 for each electrode (e.g., connection 410 from the top electrode and connection 412 from the bottom electrode, not shown) may extend past the perimeter of the pouch, for use in applying a voltage across the electrodes to operate the actuator. Optionally a "skirt" of extra film material 414 may surround circular pouch 402.

FIG. 5A illustrates a cross-sectional view of actuator 400, viewed along a dashed line A-A indicated in FIG. 4. In an example, FIG. 5A shows actuator 400 in a rest state where little or no voltage $V_0$ is applied thereto. As shown in FIG. 5A, actuator 400 exhibits a thickness 502 and a radius 506.

FIG. 5B shows actuator 400' once a voltage $V_2$ (where $V_2 >> V_0$) has been applied and the electrodes have fully zipped together. This zipping motion has caused the actuator radius to reduce to 506', while the actuator thickness has increased to 502'.

Figure 6A:
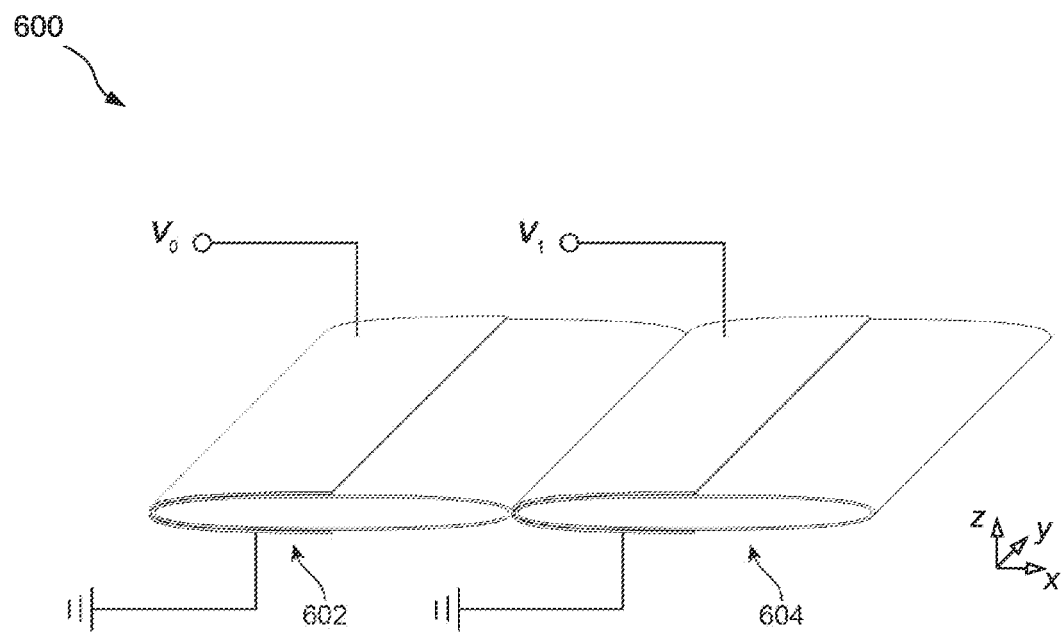
FIGS. 6A and 6B illustrate cross-sectional views of a rectangular HASEL actuator in a rest state and actuated state, in accordance with an embodiment.
Figure 6B:
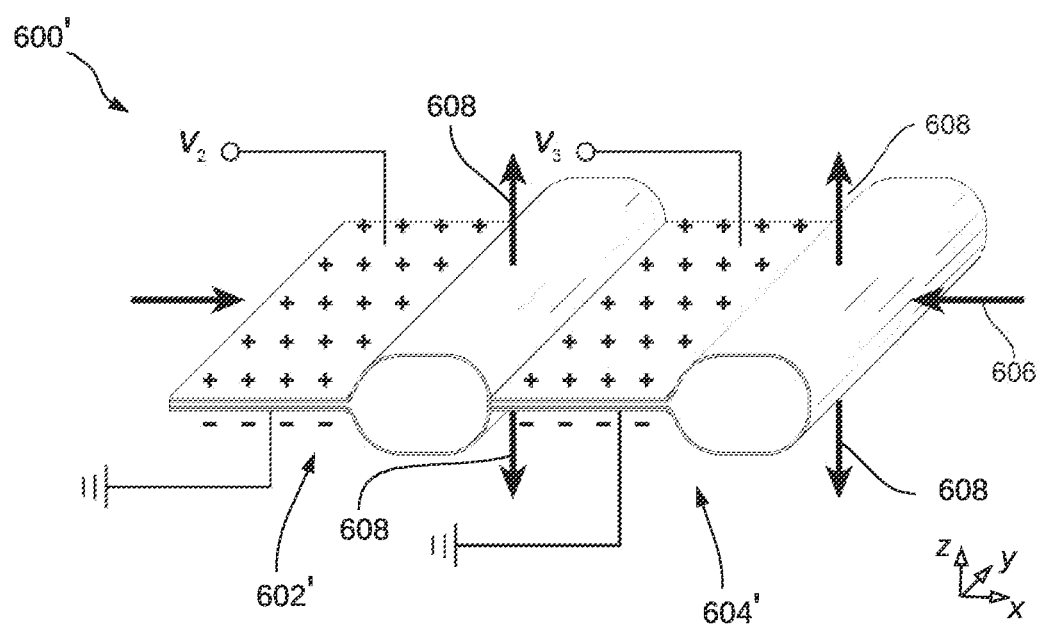

FIGS. 6A and 6B show perspective views of a HASEL actuator system 600 with a rectangular pouch shape. As an example, the actuator cross section shown in FIG. 1 may be extruded in a direction perpendicular to the page to form a pouch of a given width, as shown in FIGS. 6A and 6B. Although it is not shown, the ends of the pouches in the x-z plane would be sealed off to create an entirely closed pouch. Additionally, HASEL actuator system 600 includes two actuators 602 and 604, which are connected together in series. The configuration of HASEL actuator system 600 may be advantageous in certain embodiments, as actuation stroke for a given load will increase proportionally with the number of actuators connected in series.

The electrode pairs of each actuator may be electrically isolated from each other such that a distinct voltage may be applied to each electrode to individually address each actuator. In an example, the voltage applied to the electrode pair in each actuator may be provided from multiple voltage sources to independently address the electrode pair of each actuator. Alternatively, the voltage provided by the electrode pairs for all of the actuators may be provided from a single voltage source, or the electrodes on two or more of the actuators may be connected together so that the actuators with the connected electrodes may be activated by simultaneously and/or by a single voltage source.

FIG. 6A illustrates an example where a voltage $V_0$ is applied across actuator 602, and a different voltage $V_1$ is applied across actuator 604. In the case shown in FIG. 6A, each of the applied voltages $V_0$ and $V_1$ is too small to cause the respective electrodes to zip together.

In FIG. 6B, actuator system 600' is shown with a voltage $V_2$ is applied across the electrodes of actuator 602', and a voltage $V_3$ is applied across the electrodes of actuator 604', where each of voltage $V_2$ and $V_3$ is sufficiently high to cause the electrodes of actuator 602' and actuator 604' to fully zip together. As a result, the thickness of actuators 602' and 604' have increased in the z-direction, while the overall length of actuator system 600' has decreased in along the x-axis, and the actuator exerts a contractile force 606 along the x-axis and an expanding force 608 in a z-direction. While FIGS. 6A and 6B shows the lower electrode in each pair of electrodes connected to a ground source, it should be appreciated that only a voltage differential is needed to create an electric field between the electrodes thus, conversely, the top electrode of one or more of the electrode pairs may be grounded instead.

Figure 7:
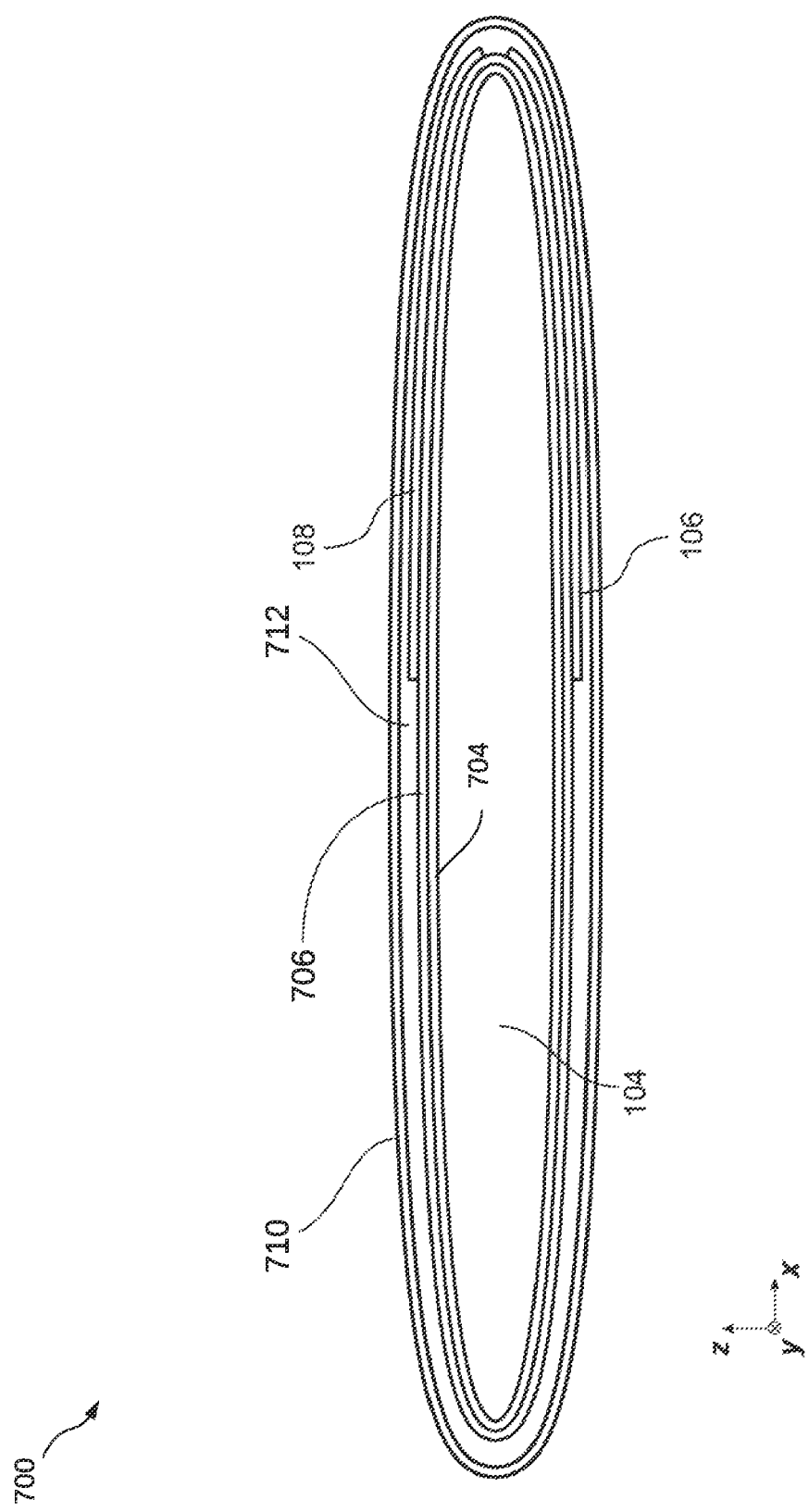
FIG. 7 illustrates a cross-section view of a HASEL actuator surrounded by an encapsulating layer, in accordance with an embodiment.

FIG. 7 shows an encapsulated HASEL actuator 700. Encapsulation can serve multiple purposes including but not limited to electrical insulation, abrasion resistance, thermal insulation, and general protection of the actuator mechanism during use. In this case illustrated in FIG. 7, actuator 700 includes a flexible shell 702 formed of two layers containing liquid dielectric 104 therein. In an example, an inner layer 704 and an outer layer 706 may have different material properties that combine to improve actuator performance. For instance, inner layer 704 may be formed of a high permittivity material while outer layer 706 may be formed of a material with superior mechanical properties. Inner and outer layers 704 and 706 may be fused or joined together through various physical or chemical processes. While electrodes 106 and 108 are shown as being located outside of outer layer 706, it should be appreciated that electrodes 106, 108 may instead be located between the inner and outer shell layers.

Further, an encapsulating layer 710 may be formed around the combination of the flexible shell and the electrodes. Encapsulating layer 710 may form an outer pouch that may be filled with another encapsulating material 712 such as a liquid dielectric or simply an airgap. Alternatively, encapsulating layer 710 may be directly bonded to flexible shell 702 and/or electrodes 106, 108, without any additional space formed therebetween. Additionally, although only one actuator arrangement is shown contained in encapsulating layer 710, it is appreciated that multiple actuators may be contained within the encapsulating layer, as will be described in further detail at an appropriate point below.

It is noted that a single layer of actuators is quite thin (e.g., 0.3 mm in thickness), which is ideal for integrating into a variety of flexible structures. In certain embodiments, actuator stroke may be increased by stacking multiple actuators together.

FIGS. 8A and 8B illustrate another variation on encapsulation of a HASEL actuator system, in accordance with an embodiment. Encapsulation may provide a variety of advantages, such as providing electrical, thermal, and/or mechanical insulation of the actuators and their associated electronic circuitry from any surface (e.g., the attachment surface or the user coming into contact with the actuator system. In certain cases, the actuator system may include encapsulation in flexible materials, such as an elastomer, which enables the actuator system to be safe to touch, conform to different shapes, and/or withstand repeated bending and twisting.

As shown in FIG. 8A, an actuator system 800 includes several actuators 801 placed in a stacked configuration. Each actuator 801 may be, for example, actuator 400 of FIGS. 4-5B. The stacking of actuators 801 may result in larger total change in thickness when the stacked actuators are activated. The top and bottom of the actuator stack is covered with a top plate 806 and a bottom plate 808. In an embodiment, each of top and bottom plates 806 and 808 are of a sufficient stiffness such that the plates distribute the expanding force from the actuators over a larger area of the plates. In some embodiments, the top and bottom plates may instead be positioned between actuators 801 within the stack. In certain embodiments, spacer plates (not shown) may be inserted between actuators 801 in addition to top and bottom plates 806 and 808 (see, for example, Mitchell, et al., "An Easy-to-Implement Toolkit to Create Versatile and High-Performance HASEL Actuators for Untethered Soft Robots," Advanced Science, 2019, 6, 1900178).

Referring concurrently to FIGS. 8A and 8B, stack of actuators 801 is contained within an encapsulating layer 820. In an example, encapsulating layer 820 may be formed of a flexible, elastic, and/or stretchable material. Encapsulating layer 820 may serve multiple purposes including but not limited to electrical insulation, abrasion resistance, and/or providing an elastic restoring force. Encapsulating layer 820 may be filled with a filler material 822, such as air or with dielectric fluids. As shown in FIG. 8B, once fully activated, the encapsulated stack of activated actuators 801' provides expanding forces 830 in the z-direction. As shown, top and bottom plates 806 and 808 may also serve to distribute the expanding force provided by each one of the activated actuators along the surface area of the plates to act on objects placed in contact with actuator system 800.

The HASEL actuators incorporated into various actuator systems described herein are also capable of self-sensing their deformation based on the capacitance of the electrodes. Referring back to FIGS. 1-3, actuator capacitance is directly related to the area of the electrodes that have zipped together. For instance, when electrodes are fully zipped, capacitance of the actuator will be high. Applying a load to a fully zipped actuator (e.g., pushing down on the actuator pouch) will cause the capacitance to decrease as the electrodes unzip. Measurements for capacitive sensing may be integrated with the actuator driving signal, thus allowing for simultaneous sensing and actuation. This combination of actuation and sensing for two-way haptic communication may be beneficial for haptic applications that may have limited space for actuators and sensors. For example, a button could detect when a user presses it and simultaneously provide some haptic feedback (e.g., vibration) to the user to acknowledge the user input.

Figure 9:
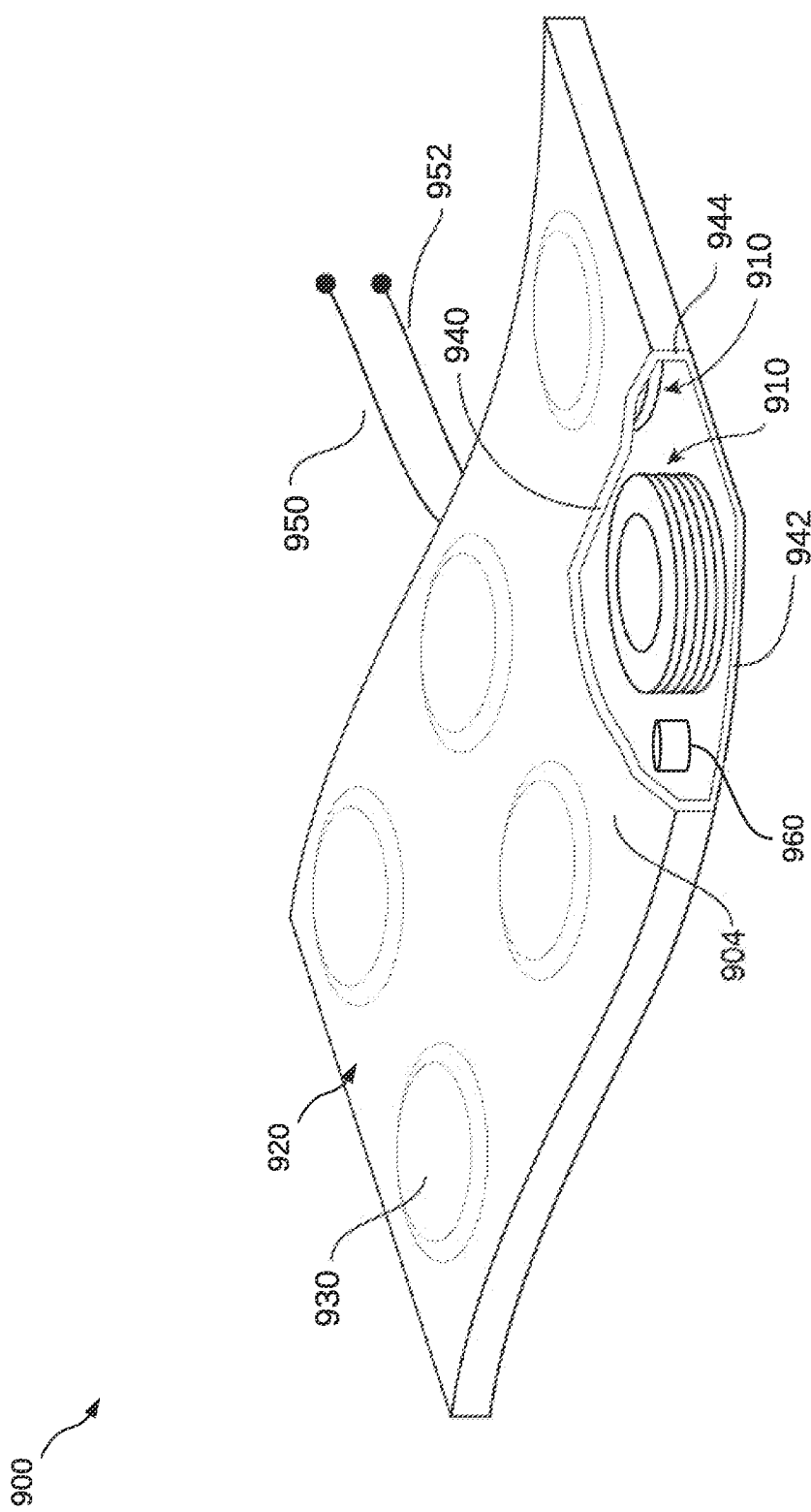
FIG. 9 illustrates an array of HASEL actuators contained in an encapsulating shell or between two encapsulating sheets, in accordance with an embodiment.

FIG. 9 shows an actuator system 900 including an array of HASEL actuator stacks 910 encapsulated within an encapsulating shell 920 to form an encapsulated sheet of actuators, in accordance with an embodiment. Actuator system 900 of FIG. 9 is shown to contain an array of six actuator stacks 910, each actuator stack 910 being configured to be independently addressable to provide localized expansion, such as in the shape of a button 930.

In an example, encapsulating shell 920 includes a top layer 940 and a bottom layer 942 connected via a side layer 944 to contain the array of actuator stacks 910. In some cases, side layer 944 may be integrally formed as a part of top layer 940 or bottom layer 942. In certain embodiments, additional side layers or internal seams (not shown) may be provided around each actuator stack 910 such that each actuator stack 910 is isolated from each other actuator stack 910 contained within encapsulating shell 920.

Encapsulating shell 920 may provide, for example, electrical insulation, thermal insulation, and/or abrasion resistance around each actuator stack 910. The materials used for top, bottom, and side layers 940, 942, and 944 may be elastic and/or flexible. Possible materials suitable for use as a part of encapsulating shell 920 are, but not limited to, elastomers, polymers, and fabrics. In certain embodiments, top layer 940, bottom layer 942, and/or side layer 944 may be formed of different materials. For instance, in some applications, bottom layer 942 may be formed of a stiff material to provide a stable backing for actuator system 900, while top layer 940 is formed of an elastomer such that actuator stacks 910, when activated, provides an expansive force toward top layer 940 to form button 930. In an example, top layer 940, bottom layer 942, and side layer 944 may be configured to contain a liquid (e.g., a liquid dielectric) or a gas (e.g., air) to provide cushioning and/or additional electrical insulation for a user or another object to safely contact actuator system 900.

Actuator stacks 910 contained within encapsulating shell 920 may be individually addressable or electrically connected with each other. Independent control of actuator stacks allows for a variety of actuation patterns that can provide massage or haptic sensations. Further, individual actuators within actuator stacks 910 may be individually addressed to provide additional granularity in the behavior of each actuator stack. For instance, patterned electrodes (not shown) may be integrated into encapsulating shell 920 or provided on an internal surface of top, bottom, and/or side layers 940, 942, and 944 to enable each actuator stack 910 to be electrically coupled with a voltage source located outside of encapsulating shell 920. As an example, the patterned electrodes provided within or on a surface of encapsulating shell 920 may be electrically coupled to a power supply via connectors 950 and 952. For instance, one of connectors 950 and 952 may be connected with a ground. In some cases, a separate set of connectors may be provided for each actuator stack 910, or additional switch features may be incorporated into encapsulating shell 920 and/or actuator stacks 910 to enable individual addressing of each actuator stack. In certain embodiments, top layer 940 or bottom layer 942 may provide a common ground connection for some or all of the actuator stacks contained within encapsulating shell 920.

In certain embodiments, encapsulating shell may contain one or more proximity sensors 960. Proximity sensor 960 may be configured, for example, to sense when a part of a user (e.g., a finger or a hand) is within a predetermined distance from the encapsulating shell then, when sensor 960 is electrically coupled with one or more of the actuator stacks within the encapsulating shell, the one or more of the actuator stacks become activated. In certain cases, the activated actuator stack may force the associated button to protrude from a user-facing surface of encapsulating shell 920. Alternatively, activation of the actuator stack may sensitize that actuator stack to be responsive to subsequent user input (e.g., to be touched or pushed by the user to receive user input) without changing the shape of the associated button. In other cases, the actuator stack may be activated by sensing the user touching the associated button. In certain cases, a portion of the actuators in the actuator stack may be configured to function as a sensor, while a different portion of the actuators in the actuator stack may be configured for controlling the protrusion of the button. Further, when an array of actuator stacks are used, as shown in FIG. 9, one of the actuator stacks may function as a button-on-demand, in collaboration with a proximity sensor or touch sensing, while other actuator stacks perform other functions, such as providing vibration or sensory feedback to the user. That is, an array of actuator stacks may include actuator stacks performing different functions and, in certain cases, different actuators within a single stack of actuators may perform different functions.

Figure 10:
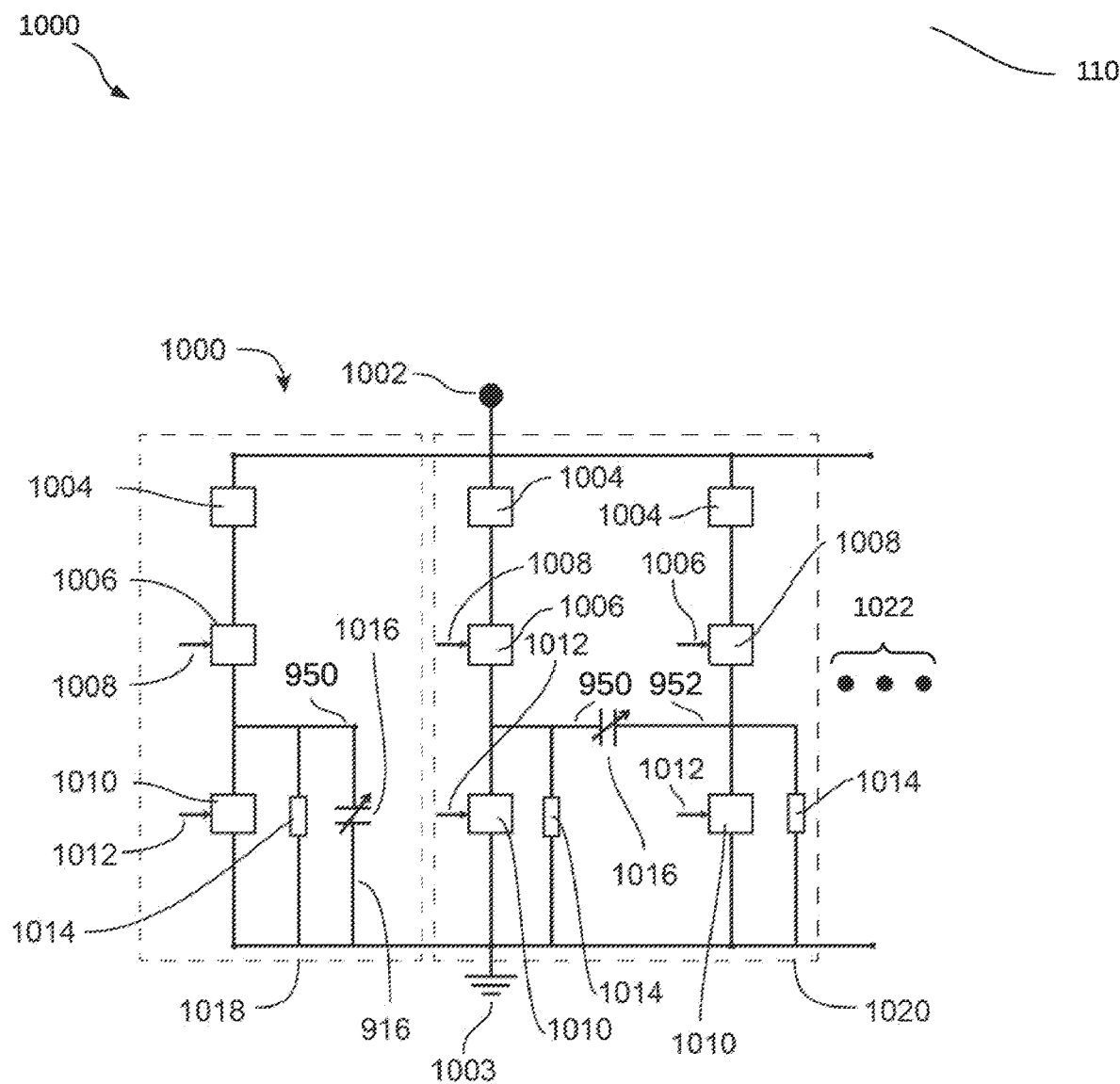
FIG. 10 illustrates a circuit schematic for multi-channel control of an array of electrostatic actuators, in accordance with an embodiment.

FIG. 10 shows a schematic for a high voltage power supply (HVPS) 1000 for providing single- or multi-channel control for controlling one or more actuators, in accordance with certain embodiments. In an example, a high voltage (HV) rail 1002 is set to the maximum desired actuation voltage. The HV source (not shown) providing the high voltage to HV rail 1002 may be, for example, a HV amplifier or HV power supply. As shown in FIG. 10, each HV diode 1004 is configured to prevent the flow of charges back to HV rail 1002 or between channels that are operating at different electrical potentials. Typically, HV diodes 1004 may be required with directional components used with HV switches, such as optocouplers. In certain embodiments, HV diodes may prevent transients from affecting the rest of the circuitry, thus protecting the other circuitry and making the overall actuator system safer and more reliable. In an example, HV diodes may prevent any HV transients caused by the actuators (i.e., overvoltage) from affecting the HV source or other actuators connected to different channels.

HV power supply 1000 may be configured to drive the actuators with a single polarity (i.e., one electrode is driven to a high voltage to charge the actuator while the other electrode remains connected to a low potential/ground), as indicated by a dashed box 1018. Alternatively, HV power supply 1000 may be configured with reversing polarity in an H-bridge configuration (i.e., either electrode can be driven to high voltage or connected to ground), as indicated by a dashed box 1020.

In either configuration, a first HV switch to charge 1006 is controlled with a first low voltage control signal 1008 (indicated by an arrow) to distribute charges from the HV rail to an actuator 1016 at the output of a channel, such as connected with connector 950 of FIG. 9. The conductance of HV switch 1006 may be controlled by first low voltage control signal 1008 to vary the amount of charge stored by the actuator and therefore its activation state. First HV switch 1006 may include for example, but not limited to, a reed relay, an optocoupler, a MOSFET, or an IGBT.

A second HV switch to discharge 1010 may be controlled with a second low voltage control signal 1012 (represented by an arrow) to distribute charges from actuator 1016, for example from connector 952 of FIG. 9, to ground 1003. The conductance of second HV switch 1010 may be controlled by second low voltage control signal 1012 to vary the amount of charge stored by actuator 1016 and again its activation state. A voltage monitor 1014 may be used to measure the voltage at the output of connections 950 and 952. As an example, a voltage divider may be used to generate a low voltage replica of the HV signal measurable using traditional microcontrollers operating at, for instance, 3.3V.

This multi-channel power supply configuration may be extended to an arbitrary number of channels, N, to drive N actuators in single polarity configuration or N/2 actuators in reversing polarity configuration (as indicated by ellipsis 1022). One actuator 1016 (or a stack of actuators addressed as a stack) may be placed at the output of each channel (e.g., electrically coupled with connectors 950 and 952) and may exhibit a variable capacitance. Analog HV switches, such as optocouplers or MOSFETs, may be used to distribute charges from a centralized HV amplifier (i.e., HV rail 1002 set to a desired voltage) to an arbitrary number of output channels. In this way, HV power supply 1000 is advantageous in that it does not require a highly dynamic HV amplifier that can quickly change its full-scale voltage output. Further, as the HV source is often the largest and most expensive component of the actuator system, the present configuration provides a significant size and cost advantage in that only a single HV source may be required to provide an arbitrary number of independently controlled outputs.

The architecture of HV power supply 1000 is effectively a charge-controlled driving scheme, where charges are added to the output channel using the charging switch and/or removed from the output using the discharging switch. Since the switches are independently activated, charges can be added or removed from the output in order for the output to reach and/or maintain a desired state. That is, the outputs can be at or below the voltage of the HV rail at any desired voltage level, and the desired voltage may be achieved at a nearly arbitrary rate. Therefore, this architecture enables substantially arbitrary control of an arbitrary number of outputs, both in terms of state and rate at which the outputs reach that desired state.

Importantly, the use of a discharging switch allows active control of the state of actuation during discharge as well as the discharging rate. For actuators, this feature may be considered analogous to eccentric contraction of skeletal muscles. Since the discharge mechanism of an electrohydraulic actuator, such as the HASEL actuator, is active, not passive (which is common in the field), the actuators are able to maintain a 'catch' state using the described power scheme, whereby they actuate and hold a position without consuming much energy. The circuitry described herein provides active discharge without requiring a large resistor connected in parallel with the actuator. That is, discharging of electrostatic or electrohydraulic actuators is generally a passive process accomplished by placing a large resistor in parallel with the actuator. The large resistor can limit bandwidth, increase steady state power draw, and limit the benefits of the "catch" state of the actuator, as the actuator would constantly be discharging through the resistor rather than holding its charge. Such a scheme further enables the implementation of compact multichannel high voltage power supplies, since only one HV amplifier (typically the largest electrical component) is required and each HV switch may be small. Since the actuators described herein primarily consume power only when charging and release power when discharging, the control signals of the charging and discharging switches may be programmed to power the switches in sequences that match the charging and/or discharging current profiles of the actuators used in the overall system. In other words, each switch is only powered for the duration in which the associated actuator is charging or discharging, thereby reducing the power consumption of the entire array of switching elements.

Figure 11:
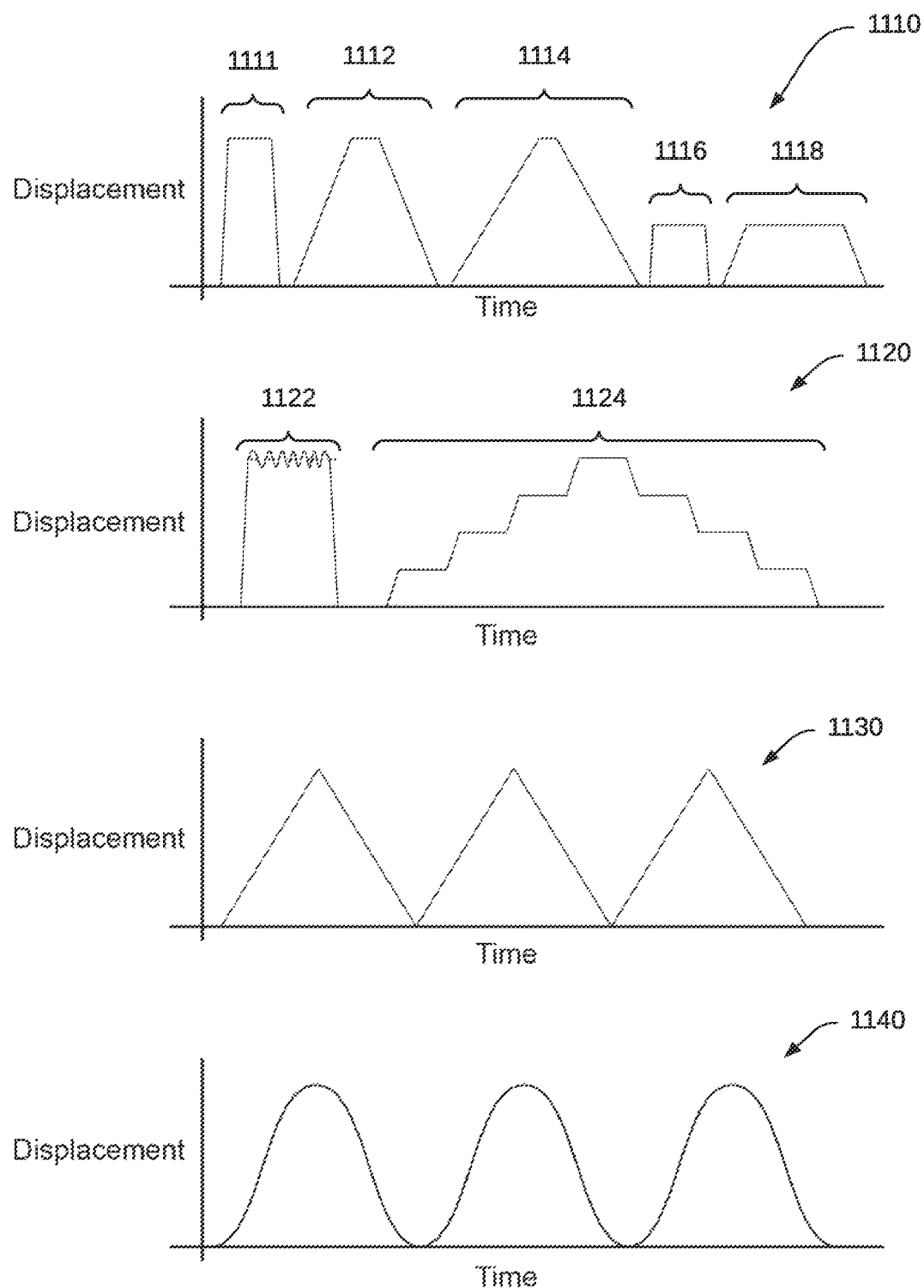
FIG. 11 illustrates several possible motion profiles that can be achieved with HASEL actuators, in accordance with an embodiment.

FIG. 11 illustrates examples of motion profiles of HASEL actuators which may be achieved using HV power supply 1000 of FIG. 10. The four plots in FIG. 11 show displacement as a function of time. Actuation profiles for HASEL actuators may be square (as shown in first plot 1110) with varying slew rate, amplitude, and frequency (as represented by actuation profiles indicated by brackets 1111, 1112, 1114, 1116, and 1118). Waveforms may be combined to create unique actuation profiles. For example, a square wave may be combined with a sinusoidal waveform (as shown in second plot 1120 and represented by the actuation profile indicated by a bracket 1122) to provide large displacement and vibration feedback. Similarly, stepped displacement profiles may be achieved (as represented by actuation profile indicated by bracket 1124). Other common possibilities include triangle waveforms (as shown in third plot 1130) and sinusoidal waveforms (as shown in fourth plot 1140) with constant or varying amplitude and frequency. Importantly, any of these displacement profiles may be superimposed to achieve essentially arbitrary displacement profiles. Such flexibility in actuation profiles is achievable due in part to the unique actuation properties of HASEL actuators, in which voltage is directly coupled with shape change of the actuator structure, as well as the high level of control that can be achieved with HV power supply 1000 of FIG. 10.

Figure 12A:
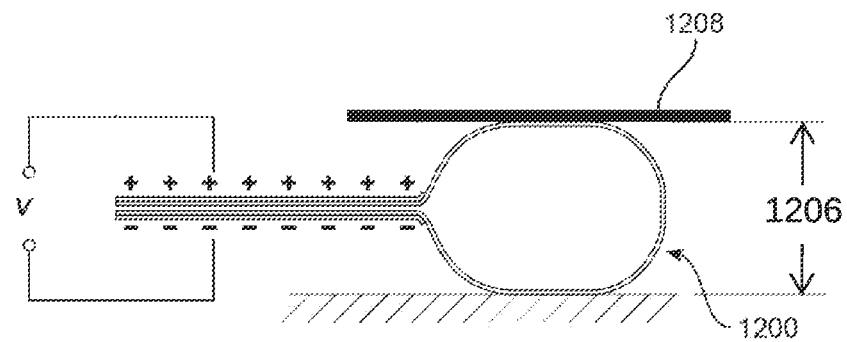
FIGS. 12A and 12B illustrates a HASEL actuator functioning as a sensor that detects when an external force is applied by a user, in accordance with an embodiment.
Figure 12B:
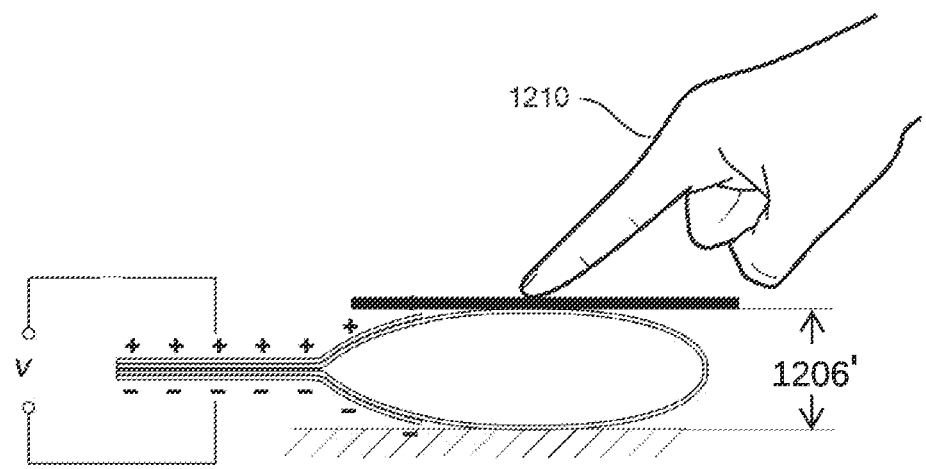

FIGS. 12A and 12B illustrate how a HASEL actuator may be used a sensor. As an example, the structure of a HASEL actuator 1200 may function as a variable capacitor, where the electrodes of the HASEL actuator function as the electrodes of a parallel plate capacitor. The multi-layered structure of dielectric films and dielectric liquid separating the electrodes function as the dielectric of a typical parallel plate capacitor. The capacitance outside of the zipped length of the electrodes (i.e., capacitance in the expanded portion of the actuator containing the dielectric fluid) is essentially negligible.

To demonstrate how this structure can function as a sensor, FIG. 12A shows a HASEL actuator 1200 with an applied voltage V which causes the electrodes to fully zip together. In this state the flexible shell portion of HASEL actuator 1200 has expanded to a thickness 1206. Optionally, a plate 1208 may be positioned on top of the actuator to help transmit an external force to the actuator. When a user 1210 applies a force to the actuator, optionally through plate 1208 as shown in FIG. 12B, while the applied voltage V remains constant, the actuator exhibits a reduced thickness 1206'. Due to the applied force, the dielectric fluid within the flexible shell is pushed back toward the electrodes to partially unzip the electrodes apart, thus reducing the capacitance of the pair of electrodes. This change in capacitance may be detected, for instance, by monitoring the impedance of the actuator using various methods known in the art. As an option, the sensing behavior may be calibrated so that capacitance may be measurable as a function of applied voltage 1202, zipped length of the electrodes, and/or actuator thickness. Such a functionality may be leveraged for a variety of applications such as, but not limited to, providing closed loop control for precise and controlled actuation, analog or binary signal generation for sensing of proximity or touch, and as part of a combination sensor in conjunction with an external sensor, such as force sensitive resistors, optical sensors, and/or fabric sensors.

Figure 13:
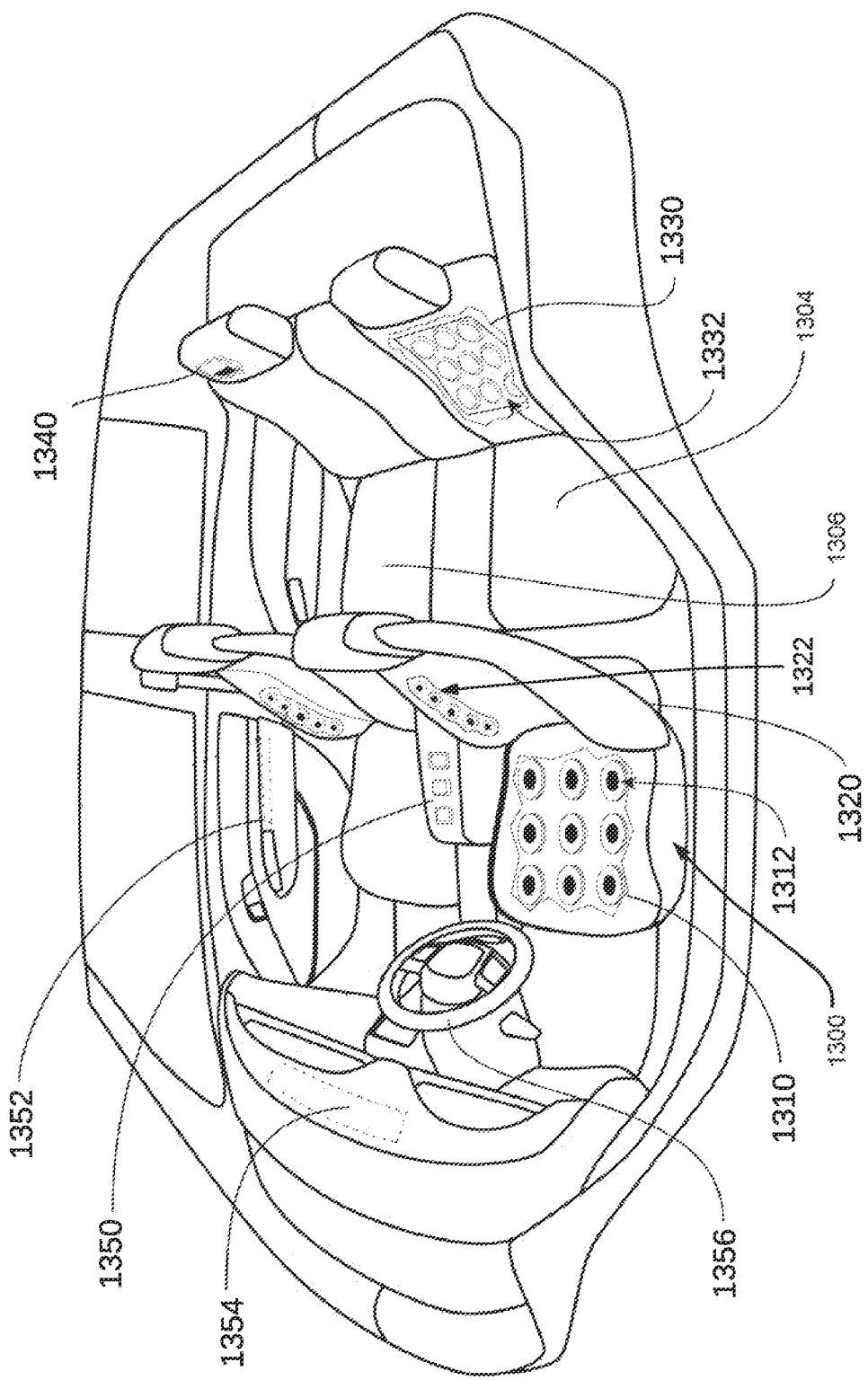
FIG. 13 illustrates soft actuators integrated into various locations within the interior of an automobile to provide tactile sensations and feedback, in accordance with an embodiment.

FIG. 13 illustrates the interior of an automobile including several HASEL actuators integrated into many surfaces and interfaces that with which drivers and passengers interact, in accordance with certain embodiments. For instance, a driver's seat 1300 has been fitted with HASEL actuators in several locations. Seat cushion 1310 has an array of HASEL actuators 1312 embedded therein. Actuators in the seat cushion can serve many functions such as, but not limited to: 1) providing a massage for the user; 2) adjusting the seat shape to reduce driver fatigue or pain points; and 3) providing vibration for notifications or entertainment. Similarly, seat bolsters 1320 may be integrated with an array 1322 of actuators for providing tactile sensation and/or seat adjustments for a driver's back and sides.

Similar actuator integrations may be applied to any of the other seats within the automobile. For instance, any seat back 1330 may be provided with encapsulated arrays of actuators 1332, either integrated into the internal surface of the seat back or as an external addition, to provide massage, vibration, and/or seat adjustment functions. In an example, encapsulated sheets of actuators may provide ease of installation within the seat assembly, as a sheet of HASEL actuators may be easily placed between the seat cover and cushion with simple mechanical connection points (e.g., an adhesive, snaps, and/or hook-and-loop attachments) and a single cable bundle that connects to a HV power supply and the vehicle control unit. Such a system may be integrated with any seat or surface within the vehicle. Further, actuators 1340 integrated into the headrest may provide vibration for massage, haptic responses for notifications, and can produce movements that are synchronized with music or other entertainment in the car.

In addition, HASEL actuators integrated into an automotive seat may simultaneously function as sensors. For example, the actuators may be used to sense the size, weight, and/or location of a passenger to adjust air vent direction and airbag activation. Using an array of HASEL sensors integrated into various areas of the automotive seat, typical passengers or drivers may be recognized based on their size and/or weight. This information may be used to determine correct seat position, mirror position, airbags, vent direction for climate systems, and suggested routes for navigation, such as suggesting the quickest route for a typical morning destination for a particular driver. Sensors may also be used to detect when someone has been sitting or driving too long and cause the passenger or driver to suggest a break by, for example, providing a vibration signal.

Beyond seating applications, many surfaces that a user touches may utilize HASEL actuators. For instance, HASEL actuators can be incorporated to surfaces to act as buttons that appear on demand, such as using the encapsulated actuator array shown in FIG. 9. Such "buttons-on-demand" may normally be disguised as a completely flat surface and may pop-up when a user is in close proximity to the surface, thus reducing the number of static buttons on a center console 1350, arm rests 1352, dashboard 1354, and steering wheel 1356 for more aesthetically pleasing appearance and fewer distractions for drivers and passengers. Further, HASEL actuators used as buttons-on-demand may simultaneously act as sensors to collect user input to replace buttons and other control features typically found in a vehicle (e.g., navigation, radio, entertainment, signaling, and ignition, to name a few examples). Optionally, a control system 1390, such as the onboard computer of an automobile or a dedicated processing system for interfacing between the onboard computer of a vehicle and the various actuator systems integrated into the vehicle, may be used to provide centralized control of the actuators and actuator arrays used with the vehicle. As an example, the control system may control the activation of specific actuator functions according to user input from a central user interface in the vehicle.

While FIG. 13 illustrates use of these systems in an automobile, it should be appreciated that these features could be useful for a variety of vehicles, transportation modalities, as well as stationary seating systems, such as gaming seats, sofas, and seats used in simulators and training systems.

Figure 14:
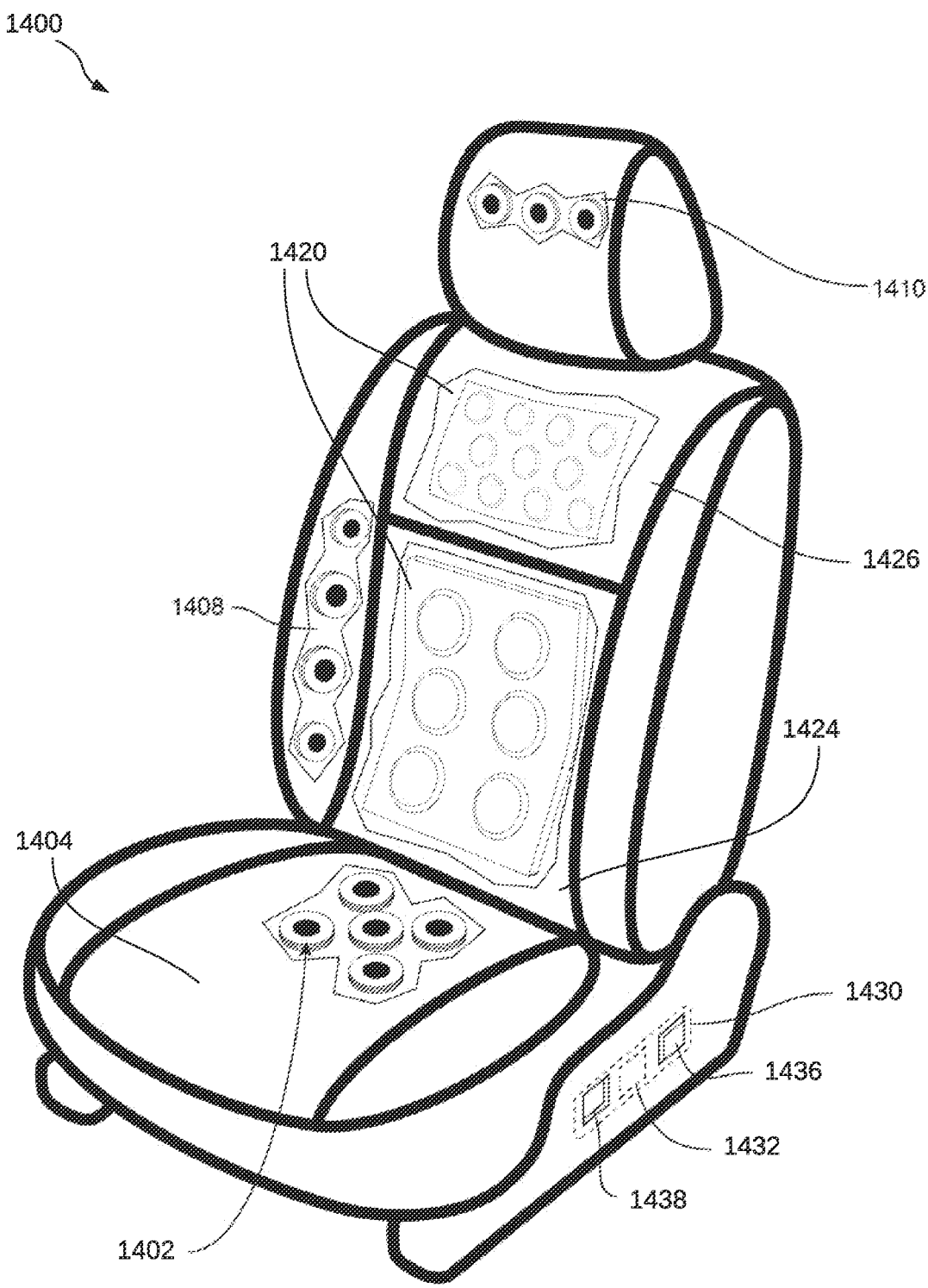
FIG. 14 illustrates a seat that has incorporated soft actuators for tactile sensation, haptic feedback, and buttons-on-demand, in accordance with an embodiment.

FIG. 14 shows a detailed illustration of a seat 1400 containing multiple arrays of HASEL actuators, in accordance with certain embodiments. For example, arrays of actuators 14020 of varying sizes may be integrated into seat cushion 1404, bolster 1408, and head rest 1410. Similarly, encapsulated arrays of actuators 1420 may be distributed about the seat such as in lower seat back 1424 and upper seat back 1426. It should be appreciated that any of the locations showing arrays of actuators may contain encapsulated arrays of actuators, and vice versa. Further, arrays of actuators contained within an encapsulating shell (e.g., as shown in FIG. 9) may be integrated into the structure or into a surface covering of seat 1400 (e.g., within the seat cushion, bolster, or head rest), or separately attached to any surface within an automobile using an attachment mechanism such as, but not limited to, adhesives, tape, belts, hooks, snaps, and hook-and-loop attachments.

FIG. 14 also shows multiple buttons-on-demand located on side 1430 of seat 1400. In an example, one button 1432 is deactivated so that the surface is essentially flat. Another button 1436 is activated to present as a raised surface. Conversely, a recessed button 1438 may be created by configuring the actuator integrated therein to pull into the surface at rest or upon activation. These buttons may be used, for example, to control seat position or activate other in car features such as navigation, heated seats, and/or activate massage functions in the seat, among others.

Figure 15:
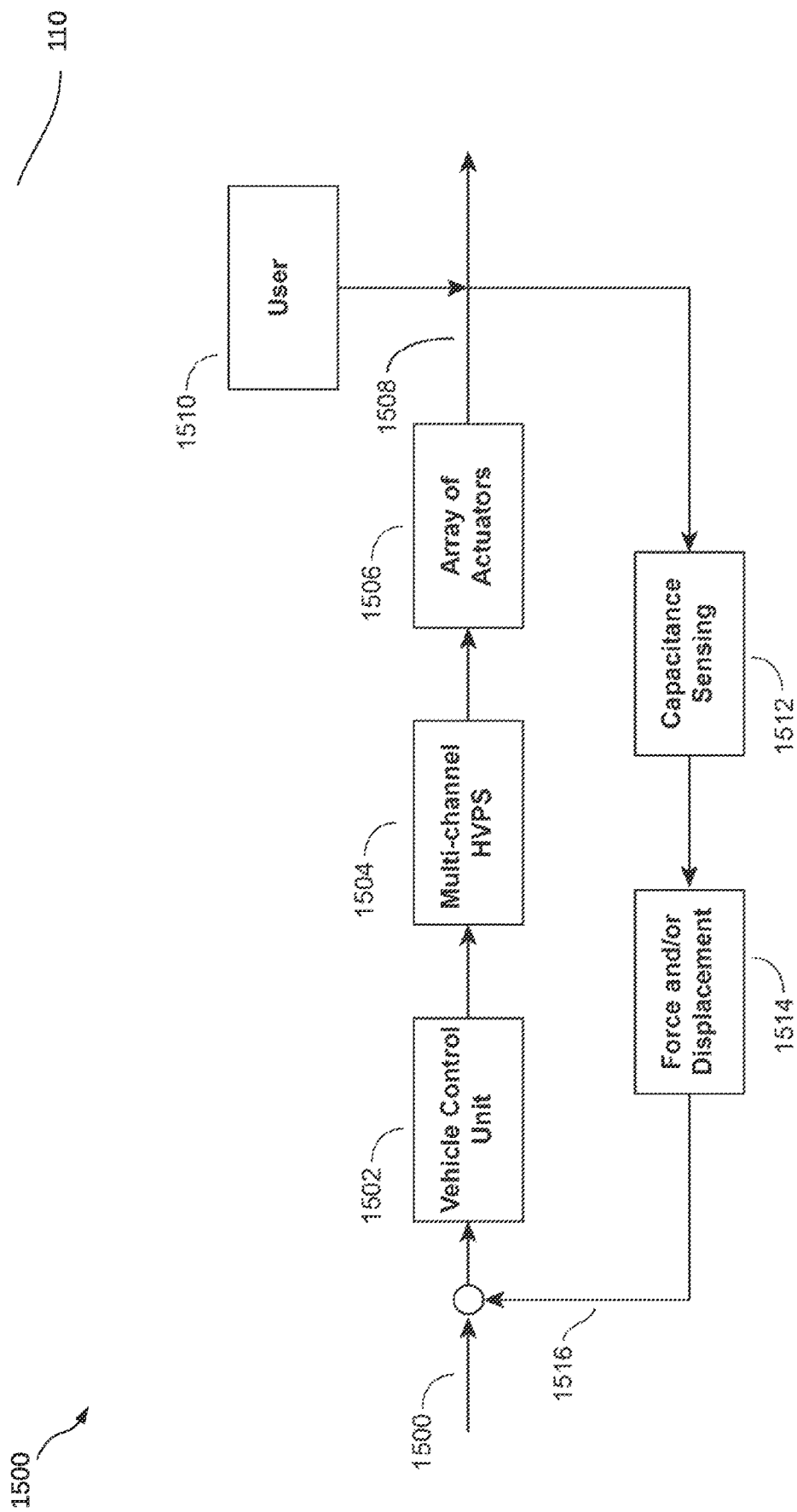
FIG. 15 illustrates a control loop for a system including a vehicle control unit, high voltage power supply, and array of actuators which is configured to interact with a user, in accordance with an embodiment.

FIG. 15 shows a possible feedback loop for actuator systems for interacting with a user to provide tactile feedback and sensation. The feedback loop of FIG. 15 begins with an input signal 1500 which is sent to a vehicle control unit 1502. Vehicle control unit 1502 in turn sends a signal to a HV power supply (shown in this example as a multichannel HVPS 1504), which provides a signal (e.g., power output) to an array of actuators 1506. Array of actuators 1506 provides a signal, in the form of a displacement, movement, or tactile feedback 1508 with which a user 1510 may interact. The user may then provide some force and displacement to the actuator which would result in a change of capacitance that would be detected by a capacitance sensing unit 1512. Capacitance sensing unit 1512 sends a signal related to the detected capacitance change to a force and/or displacement unit 1514, which in turn may provide a feedback signal 1516 toward vehicle control unit 1502. It should be noted that force and/or displacement unit 1514 optionally calculates and provides calibrated data related to the sensed capacitance change to be integrated with any new input signal provided to vehicle control unit 1502.

Figure 16A:
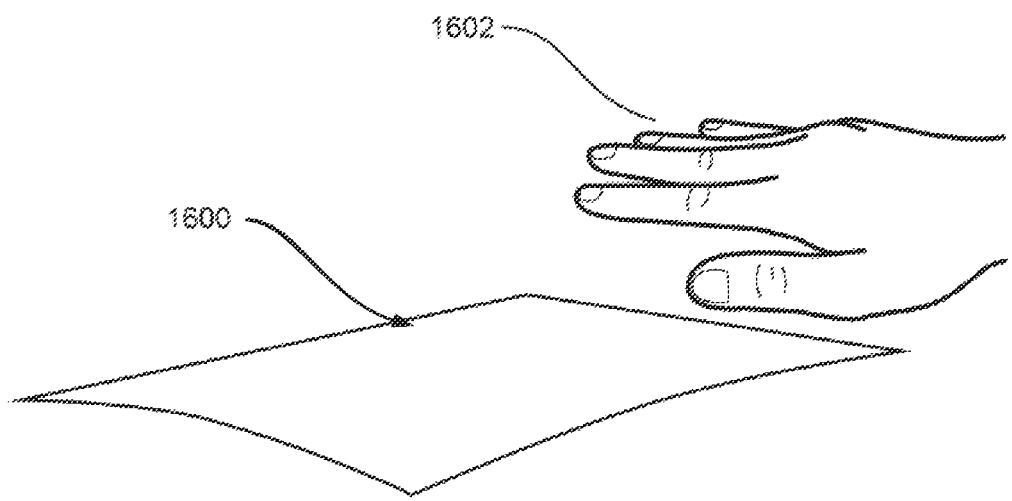
FIGS. 16A and 16B illustrate a flat surface that transforms into an array of buttons based on proximity of a user, in accordance with an embodiment.
Figure 16B:
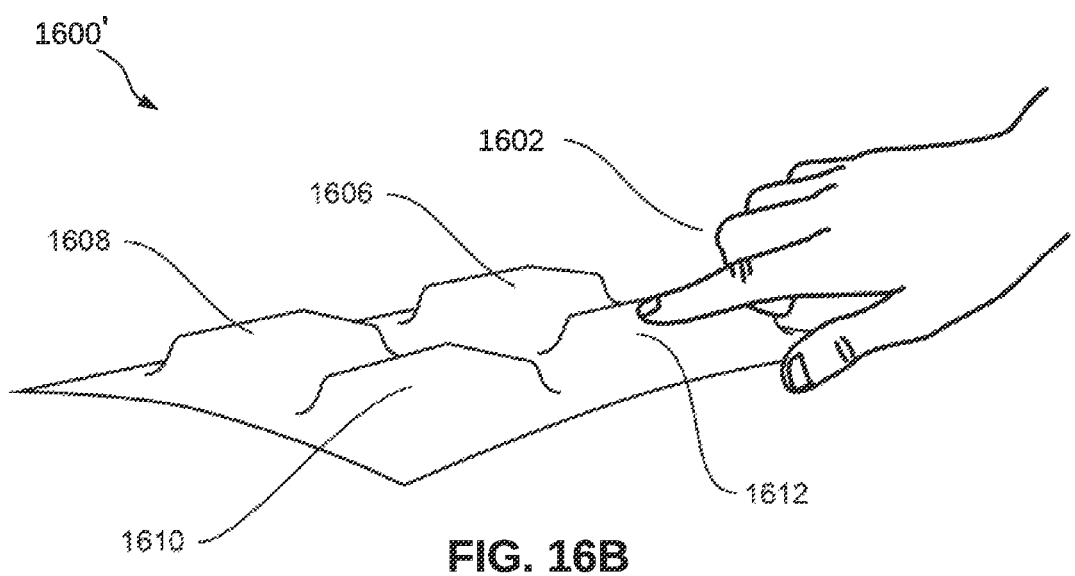

FIGS. 16A and 16B illustrate the exemplary operations of a surface containing several buttons on demand. FIG. 16A shows a flat, encapsulated actuator surface 1600 before a user's hand 1602 comes into contact with the encapsulated actuator surface. As an example, as the user's hand comes into contact or close proximity with encapsulated actuator surface 1600, the self-sensing capability of the encapsulated actuators or external sensors may detect the user. Upon detection of the user's hand nearby or in contact with the encapsulated actuator surface, the actuators contained within the encapsulated actuator surface may be caused to expand, such that buttons 1606, 1608, 1610, and 1612 protrude from encapsulated actuator surface 1600', as shown in FIG. 16B. These "buttons on demand" may be configured to sense a user's touch to relay a signal to the electronic system controlling the buttons and/or provide tactile feedback to the user. Tactile feedback may include, for example, a haptic response such as an emulated button click or a vibration signal.

Figure 17:
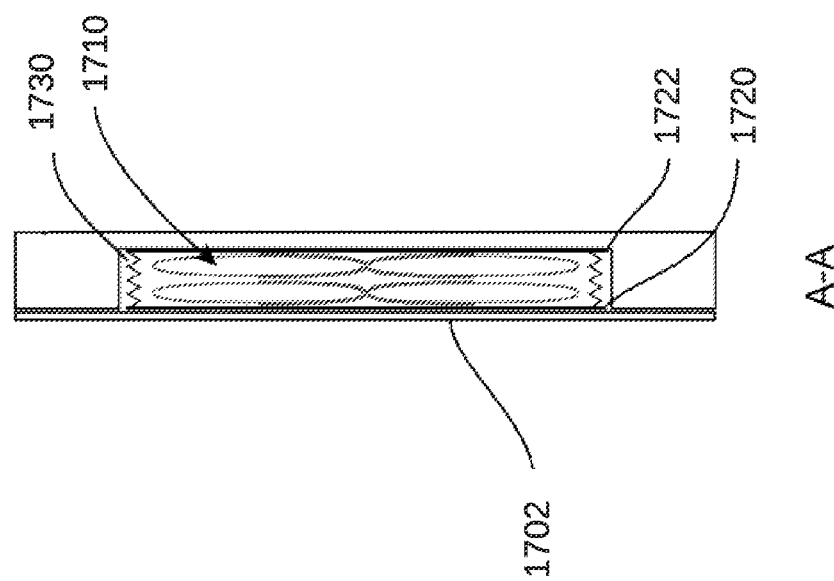
FIG. 17 illustrates a front view and a cross-section of a button-on-demand device in an inactive state, in accordance with an embodiment.
Figure 17:
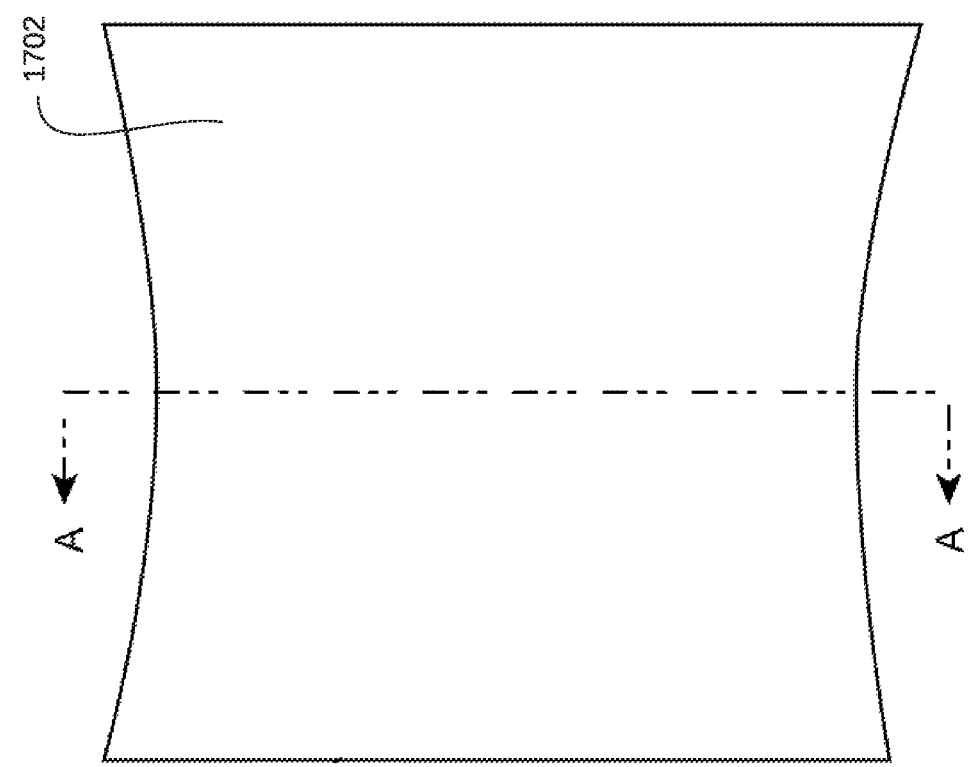

FIG. 17 illustrates a button-on-demand system 1700 based on expanding HASEL actuators suitable for use as part of encapsulated actuator surface 1600, in accordance with an embodiment. Button-on-demand system 1700 is presented as a flat, surface 1702 in a top view on the left of FIG. 17. A cross-section A-A on the right of FIG. 17 shows various components underneath surface 1702. Surface 1702 may be formed of an elastic, stretchable or flexible material, a multiple layers of materials, or a variety of materials, depending on the desired mechanical properties. Optionally, surface 1702 may be textured to emulate leather or other natural materials typically found in a vehicle interior. One or more HASEL actuators 1710 are encapsulated within button-on-demand system 1700. In an example, the one or more HASEL actuators may be sandwiched between a top plate 1720 and a bottom plate 1722 to aid in transmitting and/or distributing the force produced by the actuator when activated. Surface 1702 may optionally provide a restoring or compressive force to hold the actuator in place. Optionally, additional restoring force may be provided by a spring element 1730 such as an elastic band. In the example shown in FIG. 17, the one or more actuators are encapsulated in a pocket within button-on-demand system 1700 so that surface 1702 is flat in an inactive state.

Figure 18:
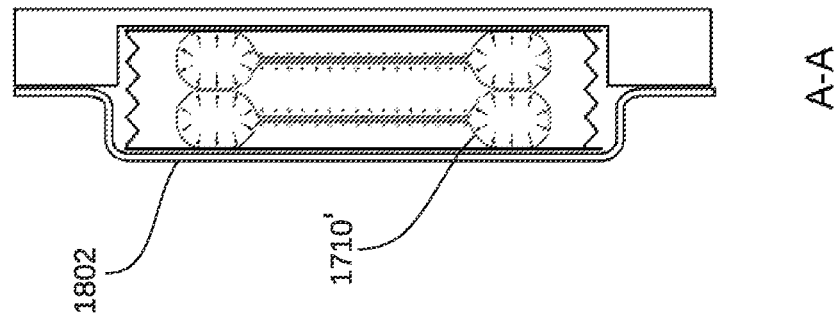
FIG. 18 illustrates a front view and a cross-section of a button-on-demand device in an activated state, in accordance with an embodiment.
Figure 18:
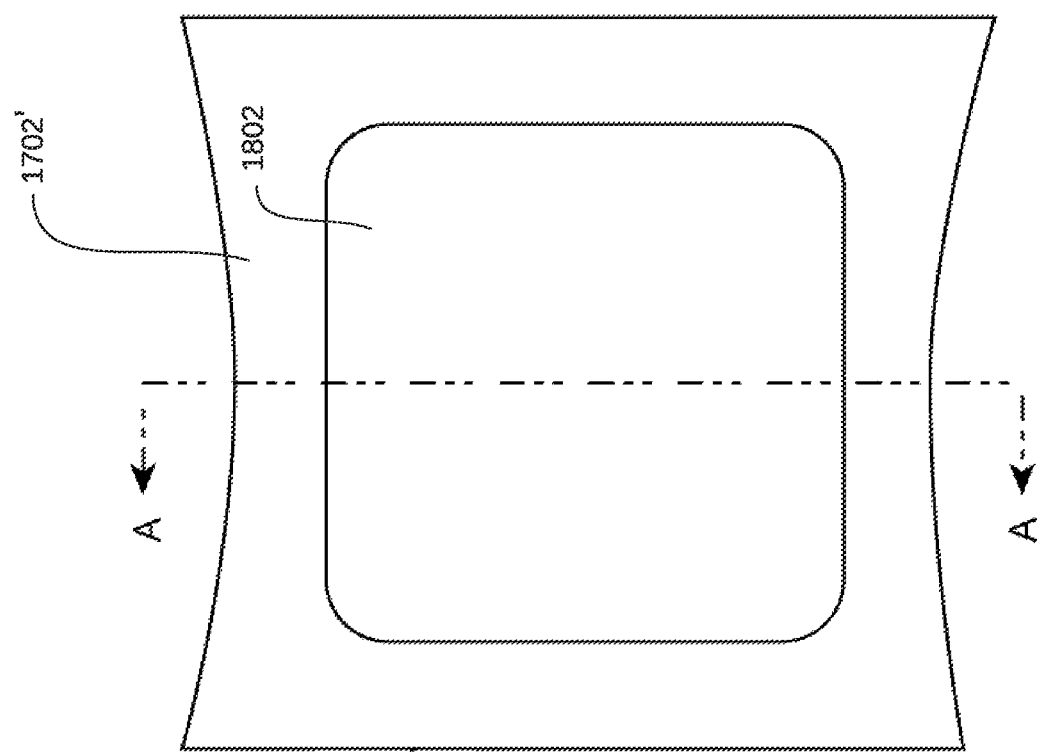

FIG. 18 illustrates an activated, button-on-demand system 1700', in which the one or more actuators encapsulated within the system has been activated such that surface 1702' now includes a raised button 1802. As visible in cross-section A-A, activated HASEL actuators 1710' expand, causing button 1802 to protrude from surface 1702'. The raised height of button 1802 may be varied based on the applied voltage to the one or more actuators 1710', as an example. Although a rectangular shape is shown for raised button 1802, it should be appreciated that other button shapes are also contemplated and are considered a part of the present disclosure. Once activated, raised button 1802 provides tactile and/or visual cues to aid users in locating and interacting with the button. Optionally, button-on-demand system may include, for example, a light emitting diode (LED) or another small light source to light up the raised button, providing an additional visual indication of the activation of the button-on-demand. As another option, the activation of the actuator may cause the surface of raised button 1802 to be modified (e.g., imbued with a new texture or heated) as another indication of the button activation.

The systems described so far rely on HASEL actuators directly interacting with a user to provide tactile sensations or change shape of a surface. Alternatively, one or more HASEL actuators may also be used to indirectly control surfaces within automobile interiors. For example, traditional systems used in vehicles to modify the configuration of seat cushions and other equipment rely on inflatable bladders, in which the size of the bladders is controlled by pressurized air generated by a pump and controlled by systems of valves that modify the flow of air in and out of the bladders. Such pumps are generally driven by electric motors, and the valves are activated by a variety of technologies such as solenoids and piezoelectric actuator systems. HASEL actuators provide an advantageous alternative for both pumps and valves.

Figure 19:
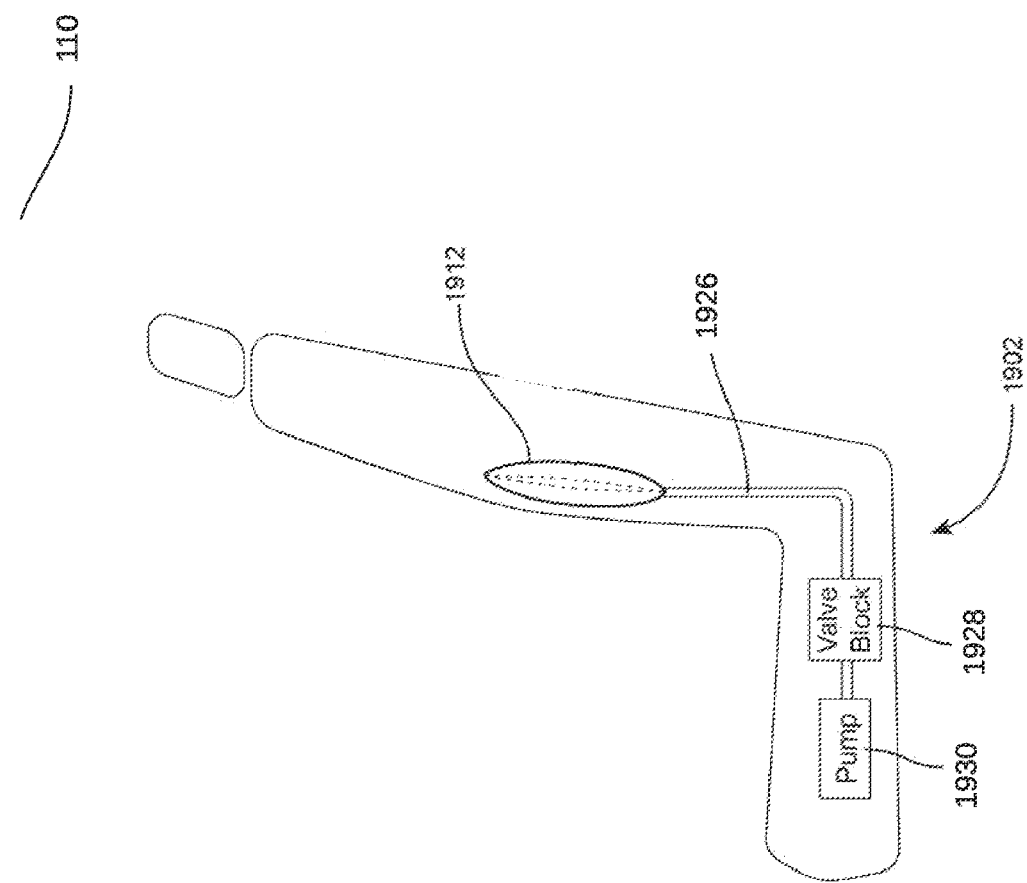
FIG. 19 illustrates a front view and a cross-sectional view of a seat utilizing a pneumatic bladder for tactile feedback and sensation, in accordance with an embodiment.
Figure 19:
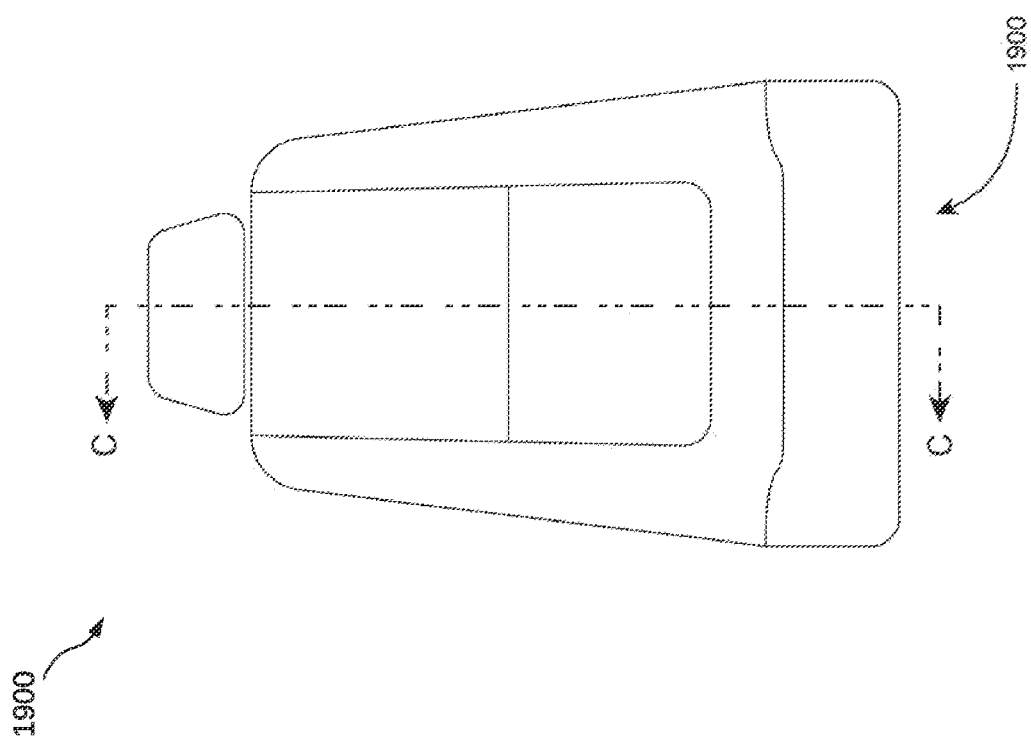

FIG. 19 illustrates a front view 1900 and a cross-sectional view 1902 of a seat containing a traditional inflatable bladder for lumbar adjustment. When empty, the bladder sits flat and a user in the seat is supported mostly by the seat cushion. Inflating a bladder 1912 changes the shape of the seat back and can provide more support for a user and may be adjustable to fit the needs and comfort of different drivers or passengers. In an example a tube 1926 leading from bladder 1912 connects to a valve block 1928. Valve block 1928 modulates the flow of air from a pump 1930 and vents air contained in bladder 1912. As shown in FIG. 19, HASEL actuators may be used to replace valve block 1928 and pump 1930. In other embodiments, HASEL actuators may also be used in place of bladder 1912.

Figure 20:
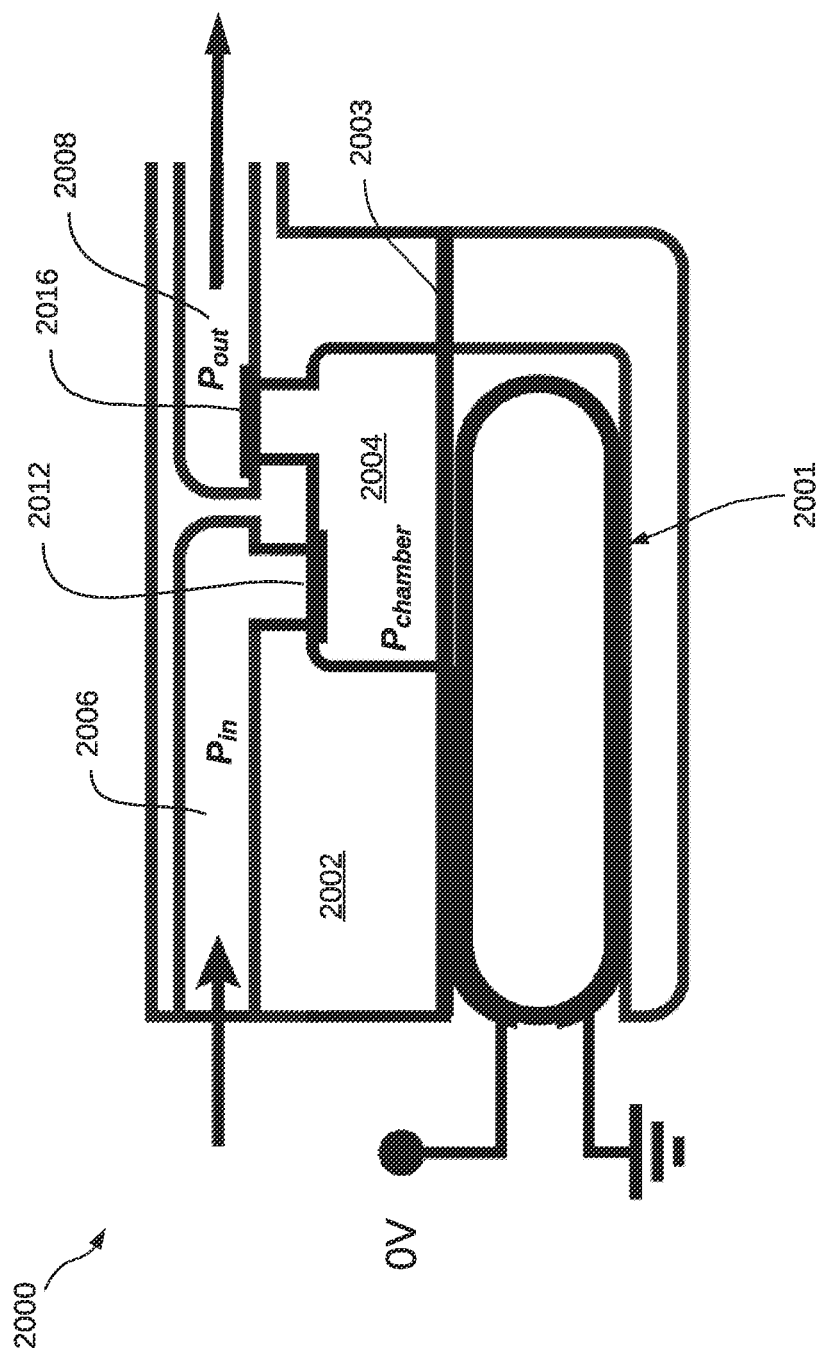
FIG. 20 illustrates a pump which utilizes HASEL actuators, in accordance with an embodiment.

FIG. 20 shows a diaphragm pump 2000 which uses HASEL actuator to control fluid flow. The pump includes an actuator 2001 including a flexible dielectric film pouch filled with a dielectric fluid. The pump further includes a housing 2002 surrounding actuator 2001, and a chamber 2004 which is separated from actuator 2001 by a diaphragm 2003. Chamber 2004 is fluidly coupled with an inlet channel 2006 and an outlet channel 2008. A first one-way valve 2012 is disposed between inlet channel 2006 and chamber 2004, and a second one-way valve 2016 is disposed between chamber 2004 and outlet channel 2008.

Figure 21A:
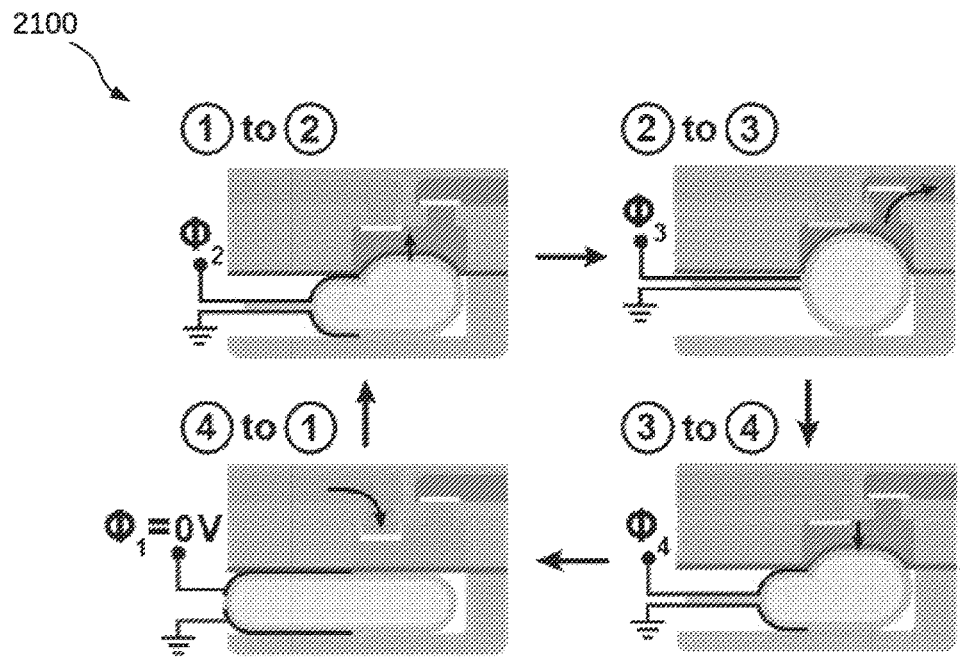
FIGS. 21A and 21B illustrate a cross-sectional view and the chamber pressure as a function of volume change of a HASEL actuator over a pump cycle, in accordance with an embodiment.
Figure 21B:
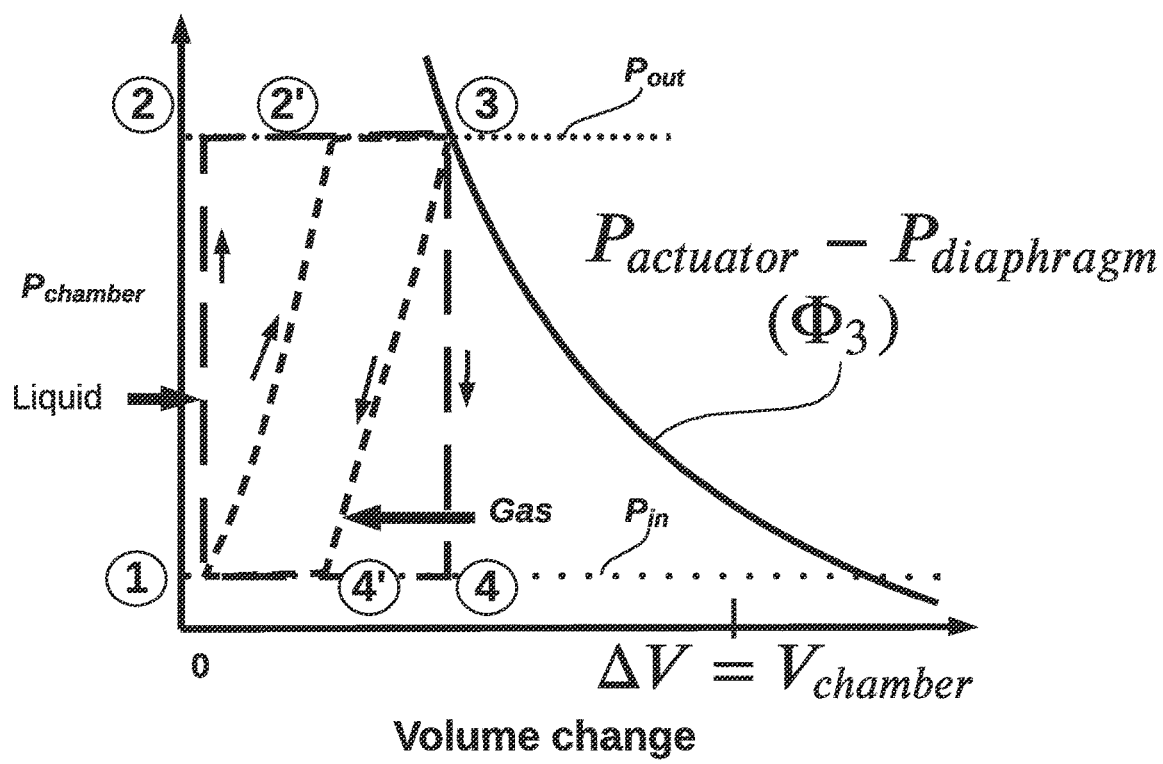

Actuation process of diaphragm pump 2000 is shown in FIGS. 21A and 21B, in conjunction with FIG. 20. Referring to FIG. 21A, a first step of actuating pump is shown in the top left figure. A voltage $\phi_2$ is applied to actuator 2001 via electrodes. As described above with respect to HASEL actuator examples, the electrodes zip together along at least a portion of their lengths, thereby pushing dielectric fluid away from the electrodes to form a more circular or bulbous pocket having an increased height compared with the off-state. The pocket engages diaphragm 2003 and pushes the diaphragm into chamber 2014. Fluid occupying chamber is pressurized due to the membrane taking up more volume within the chamber as more voltage is applied to the actuator. The application of an even higher voltage $\phi_3$ further increases the height of the actuator to increase the pressure on the diaphragm to a first threshold pressure (for example, a pressure greater than pressure of fluid in outlet channel 2008), as shown in the top right figure. Then, one-way valve 2016 unseats from the pump housing and allows fluid to pass from the chamber into the outlet channel 2008. At the bottom right figure, applied voltage is decreased to $\phi_4$ and dielectric fluid flows back toward the electrodes, thereby reducing height of the actuator and reducing pressure in chamber 2004. Once the pressure within chamber 2004 drops below a second threshold pressure (for example, the pressure of fluid in inlet channel 2006), one-way valve unseats from the pump housing and allows fluid to flow from inlet channel 2006 into chamber 2004. Diaphragm pump 2000 may be returned to its resting state, with the applied voltage reduced to $\phi_1=0$, as shown in the bottom left figure in FIG. 21A.

FIG. 21B shows pressure in chamber 2004 as a function of volume change of chamber 2004 for each of the steps in the four-step pumping cycle described in FIG. 21A. Data is shown for both gas and liquid fluids. For an incompressible fluid, the path from state 1 to state 2 is a vertical line because the incompressibility of the fluid prevents deformation of the diaphragm, until the outlet valve opens (state 2) and the fluid can flow out of the chamber at constant pressure (state 2 to 3). The maximum volume (state 3) is limited by either the volume of the chamber 2004 (i.e., all fluid is pumped out of the chamber) or by the strength of the actuator at the voltage $\phi_3$, which is the difference of the force exerted by the HASEL actuator and the force required to deform the diaphragms divided by the area of the diaphragm (the curve $P_{actuator}-P_{diaphragm}$). For an incompressible fluid, the path from state 3 to 4 is again a vertical line. When the inlet valve is open liquid flows into the chamber at constant pressure (state 4 to 1) until the pump reaches state 1.

For a compressible fluid, the volume of the chamber changes when the fluid is pressurized. In the pressure-volume plane, the process of pressurization is represented by a curved line from state 1 to state 2', the shape of which is determined by the behavior of the fluid (e.g., ideal gas law). The pumping phase for a compressible fluid follows the horizontal line from state 2' to state 3. During depressurization, a compressible fluid will expand before pressure in the chamber is low enough to cause the inlet valve to open (state 4'). This transition is again determined by the compressibility of the fluid within the chamber and is represented by the curved line from state 3 to state 4' in the pressure-volume plane. When the inlet valve is open, fluid flows into the chamber at constant pressure (state 4 to 1) until state 1 is reached.

The area enclosed by the loops 1-2-3-4 and 1-2'-3-4' represent the mechanical work output during one pumping cycle for an incompressible and a compressible fluid, respectively. More work per cycle is expected when pumping incompressible fluids such as water than when pumping a compressible fluid such as air. When pumping compressible fluids, the shape of paths from 1 to 2' and 3 to 4' depends on the ratio of the volumes of states 1 and 2', and the ratio of the volumes of state 3 and 4'. Reducing the amount of dead space within the pump chamber will increase the slope of the paths from 1 to 2' and 3 to 4', which will result in more work per cycle when pumping a compressible fluid. Ultimately the work per cycle for the pump may be limited by the performance of the HASEL actuator (state 3).

The valve blocks of the bladder system shown in FIG. 19 requires a valve block or array of valves that control the flow of fluid into and out of the bladder. Such valve blocks are used for a variety of systems both pneumatic and hydraulic. In contrast, HASEL actuators can be used to create compact valves with either binary or analog control of fluid flow.

Figure 22A:
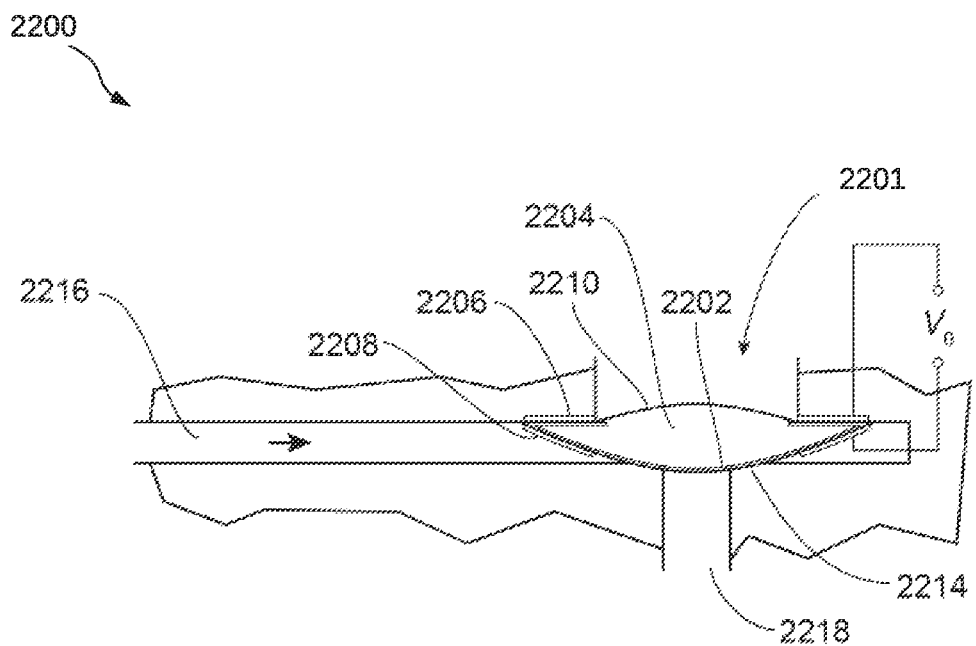
FIGS. 22A and 22B illustrate the closed and open status of a HASEL actuator-based valve, in accordance with an embodiment.

FIG. 22 illustrates a valve 2200 that is normally closed, i.e., meaning fluid does not flow when the valve is in the off-state. The valve opening is varied using an actuator 2201 which includes a pouch formed by at least a dielectric layer 2214 and a stretchable membrane 2210. The pouch is filled with liquid dielectric 2204 and a pair of opposing electrodes 2206, 2208 partially covering opposing sides of the pouch. The valve is controlled by applying a voltage across the electrodes. In FIG. 22A, the applied voltage $V_0$ is small enough that the electrodes do not zip together. FIG. 22A depicts the off state of the valve. Stretchable membrane 2210 has sufficient pressure to force the pouch against a sealing surface, which prevents flow of fluid from inlet 2216 to outlet 2218. The pouch itself may have additional layers or coatings in select positions to improve the quality of the seal between pouch 2202 and outlet 2218.

Figure 22B:
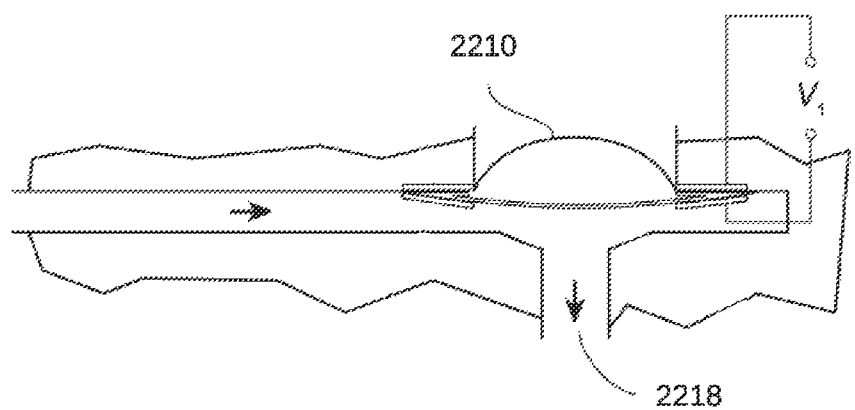

FIG. 22B shows the valve in an on state, where the electrodes have zipped together with a voltage $V_1$ applied thereto. As the electrodes zip together, the pressure within the pouch increases and causes stretchable membrane 2210 to deform. This allows the lower portion of pouch 2202 to lift away from outlet 2218, which enables fluid to flow through outlet 2218. Control of the valve may be binary (i.e., either fully open or closed) or the state of the valve may be varied continuously in order to provide a variable flow rate through outlet 2218. As the pressure and stretch characteristics of the membrane will be non-linear and may exhibit snap-through instabilities, these characteristics may be leveraged to achieve rapid opening and/or closing of the valve.

Figure 23A:
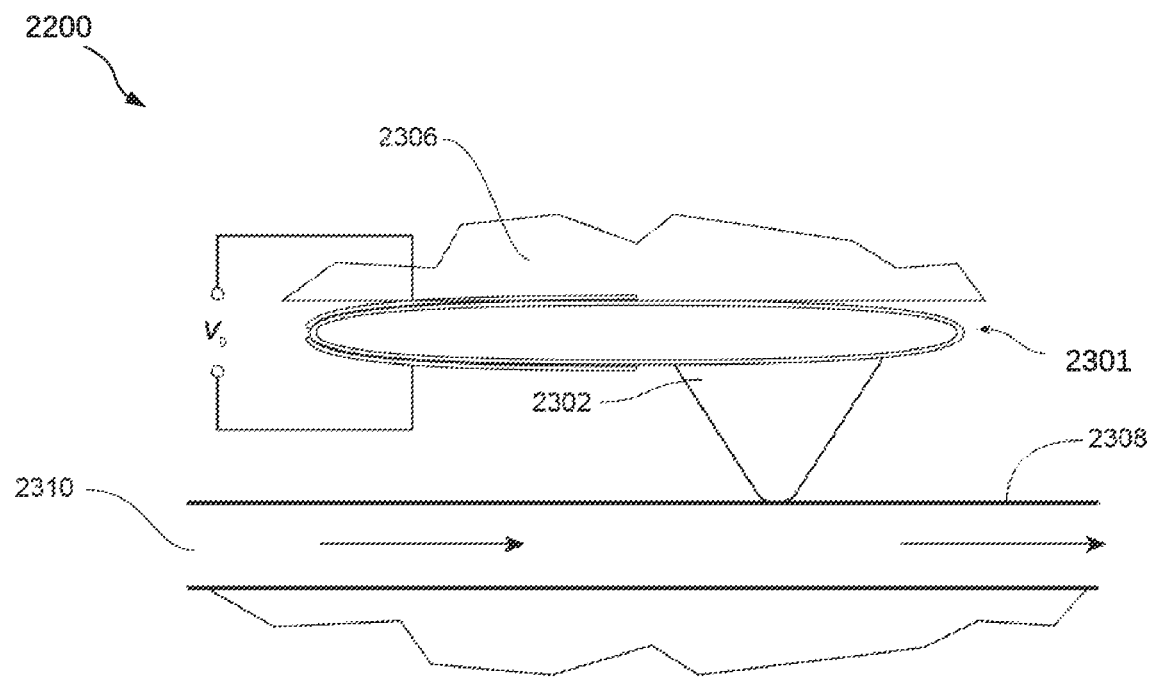
FIGS. 23A and 23B illustrate the open and closed status of a HASEL actuator-based valve, in accordance with an embodiment.
Figure 23B:
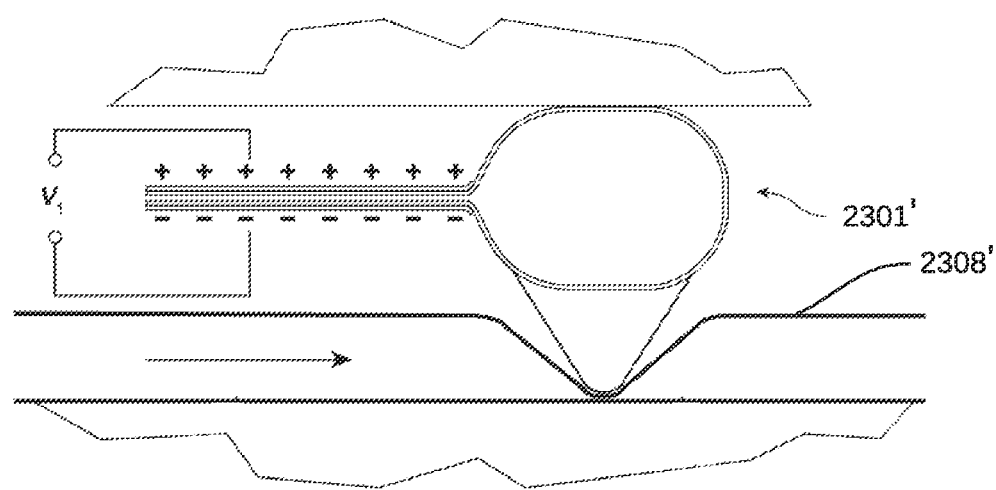

FIGS. 23A and 23B illustrate the operations of a valve 2300 which is normally open, meaning fluid flows when the valve is in the off state. The valve opening is varied using a HASEL actuator 2301. One side of HASEL actuator 2301 sits on a surface 2306 while the other is fitted with a rigid or semi-rigid part 2302 that presses against a tube 2308. Tube 2308 contains a flowing fluid such as a gas or liquid 2310. Part 2302 pressing against tube 2308 may be viewed as a clamp, which presses against tube 2308 to control flow. In this case, the wall of tube 2308 closest to HASEL actuator 2301 should be soft and deformable, while the opposite wall is rigid or in direct contact with a rigid surface. Part 2302 may be wide at the end closest to HASEL actuator 2301 and narrower at the end furthest from HASEL actuator 2301 in order to concentrate the force output of the actuator onto a smaller area. Such an approach increases the contact pressure of the actuator which increases the pressure that can be blocked by a valve. As shown in FIG. 23A, when the actuator is in an off state, fluid flows freely through tube 2308 from left to right. FIG. 23B shows the valve after the electrodes of the HASEL actuator have zipped together due to applied voltage $V_1$. Actuator 2301' has expanded, causing part 2302 to deform tube 2308'. If force and displacement of the clamp are large enough, the tube will be completely closed and the flow of fluid through tube 2308' will be blocked. Because the force and displacement of HASEL actuators can be modulated by changing the applied voltage, the valve can operate at any state between fully open and fully closed.

Figure 24:
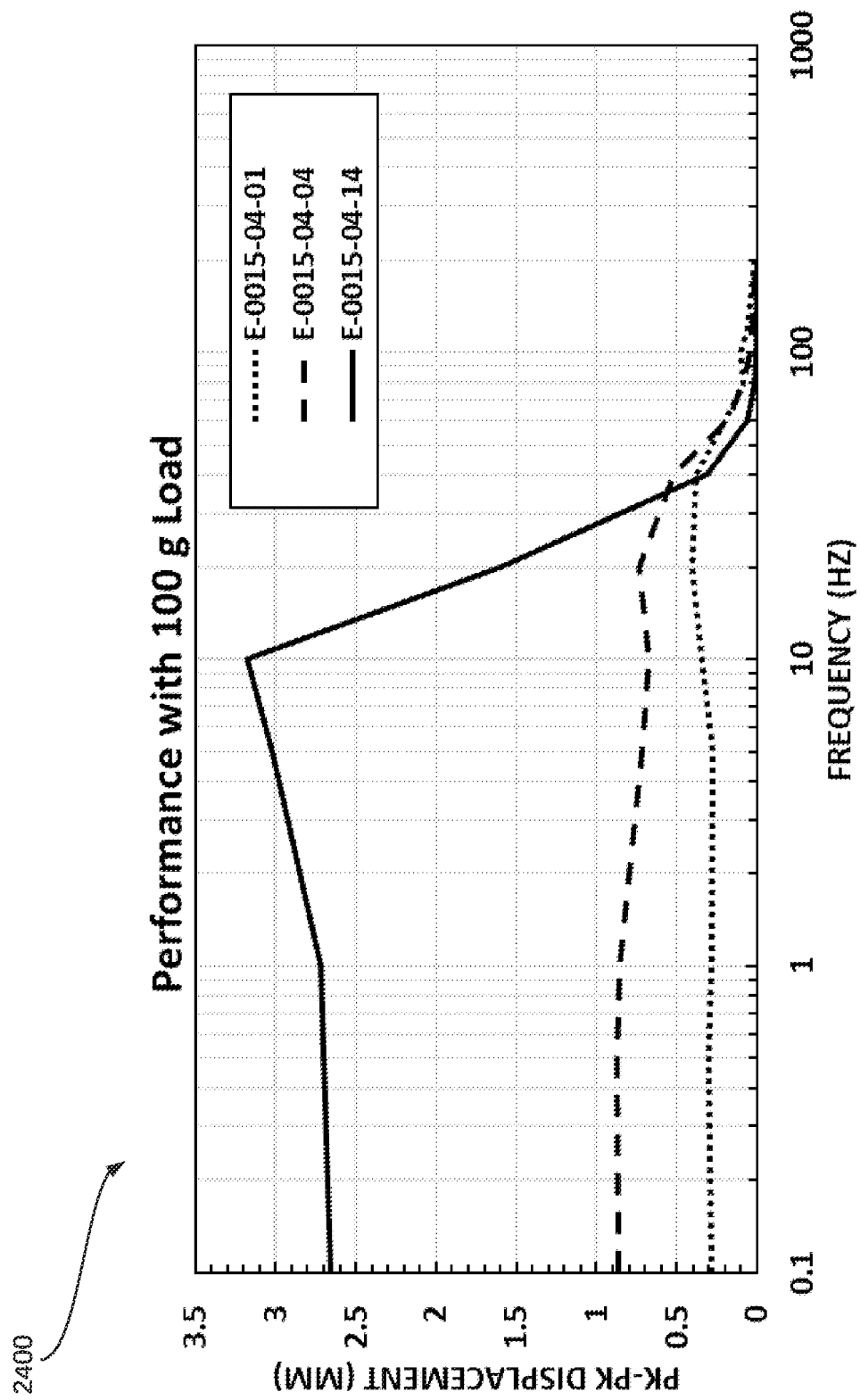
FIG. 24 shows a graph of peak-to-peak displacement performance of HASEL actuators of different layer structures as a function of frequency of the sinusoidal input signal, in accordance with an embodiment.

FIG. 24 shows a graph of peak-to-peak displacement performance of HASEL actuators of different layer structures as a function of frequency of the sinusoidal input signal, in accordance with an embodiment. Graph 2400 includes curves characterizing single layer (E-0015-01), four-layer (E-0015-04), and fourteen-layer (E-0015-14) actuators, each actuator layer having a configuration shown in FIG. 30, which is described at the appropriate junction below. While all of the characterized actuators are generally circular with a nominal diameter of 3 cm, larger and smaller diameters are also contemplated and are considered to be a part of this disclosure. As can be seen in FIG. 24, the peak-to-peak (Pk-Pk) displacement of the actuators is nearly constant, until it starts to roll-off at 10 to 30 Hz. As expected, actuators with more layers provide more displacement.

Figure 25:
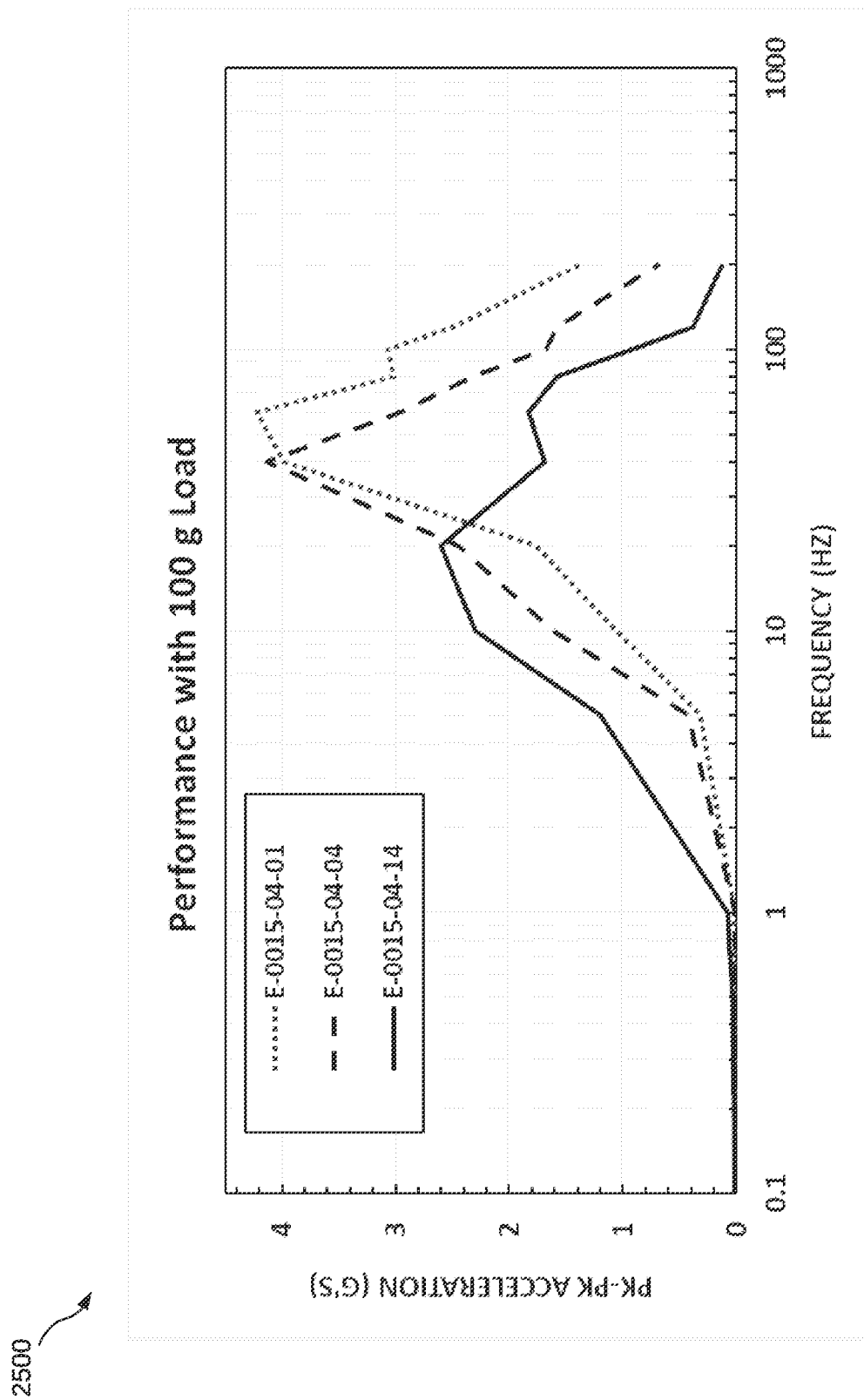
FIG. 25 shows a graph of peak-to-peak acceleration performance of HASEL actuators of different layer structures as a function of frequency of the sinusoidal input signal, in accordance with an embodiment.

FIG. 25 shows a graph of peak-to-peak acceleration performance of HASEL actuators of different layer structures (same as those evaluated in FIG. 24) as a function of frequency of the sinusoidal input signal, in accordance with an embodiment. As expected, the acceleration is essentially negligible at low driving frequencies. then, all of the actuators evaluated provide significant acceleration above 1 Hz. For instance, in the example shown in FIG. 25, the fourteen-layer actuator (E-0015-14) provides greater than 1 G of acceleration in the frequency range of 4-100 Hz. The thinner actuators have higher maximum acceleration (e.g., >4 G in FIG. 25) and operate at a higher frequency range. The higher frequency range of the single and four-layer actuators is likely enabled by the fact that each actuator presents a smaller electrical load on the power supply compared to the 14-layer actuator. That is, in cases where acceleration is more important than displacement, smaller actuator stacks may be preferable. Further, the range of performance as illustrated in FIGS. 24 and 25 highlights the ability to tune haptic performance with different actuator sizes.

Figure 26:
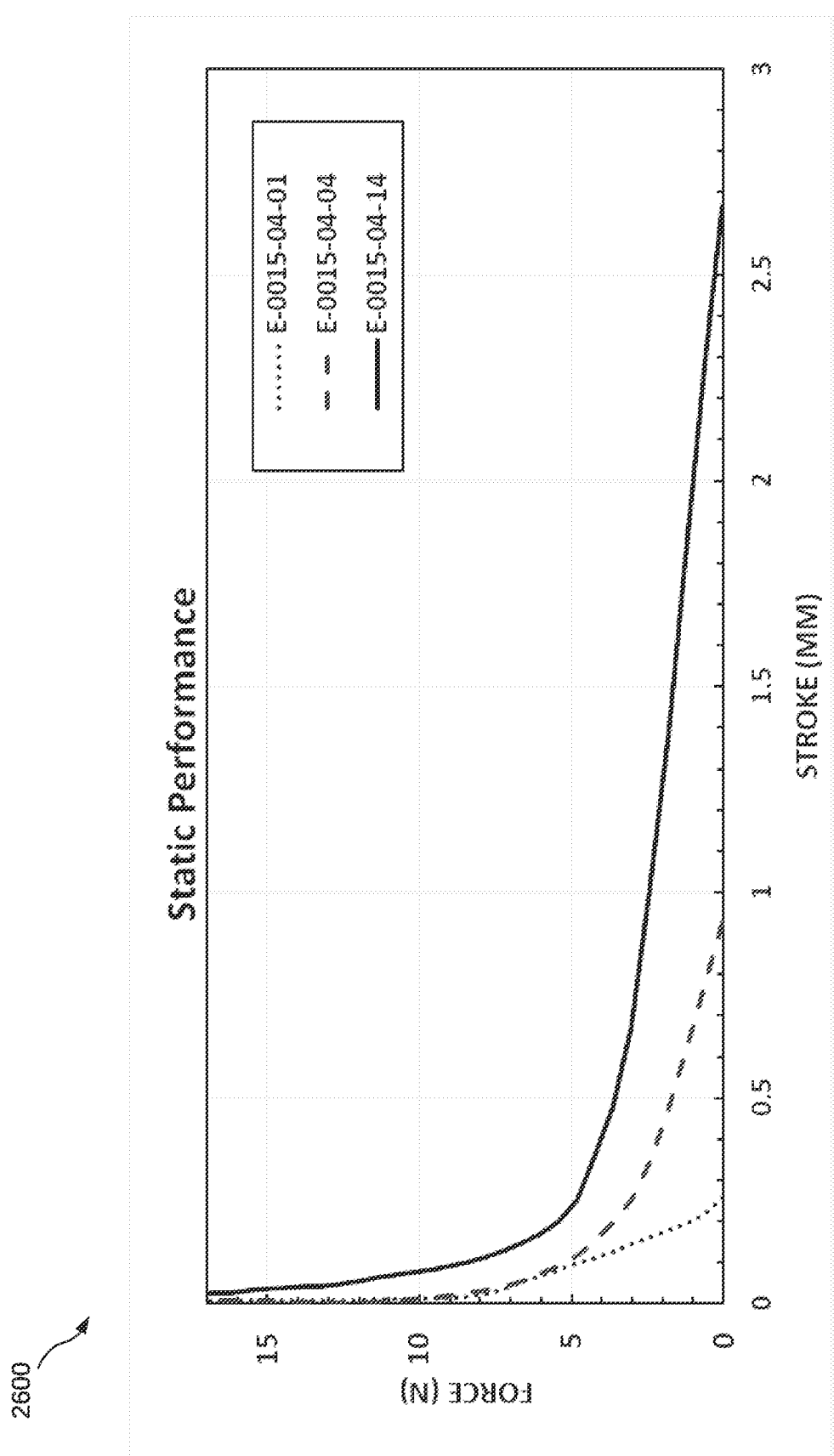
FIG. 26 shows a graph of static force performance of HASEL actuators of different layer structures as a function of actuator stroke, in accordance with an embodiment.

FIG. 26 shows a graph of static force performance of HASEL actuators of different layer structures as a function of actuator stroke, in accordance with an embodiment. As shown in FIG. 26, force output varies with stroke, starting with a maximum force (blocked force) at zero stroke and decreasing at higher stroke. Different actuator system parameters, such as actuator size (i.e., diameter in the case of the actuator systems evaluated in FIGS. 24-26), the number of actuators in each stack, and the number of actuator stacks operated in parallel to meet the specific performance and size requirements of an application.

Actuator response time is another important factor for effectively transmitting haptic information. For low latency communication, the actuator should have a short response time to a changing input signal. Additionally, a short response time relates back to the actuator acceleration, as humans are more sensitive to haptic signals at higher acceleration.

Figure 27:
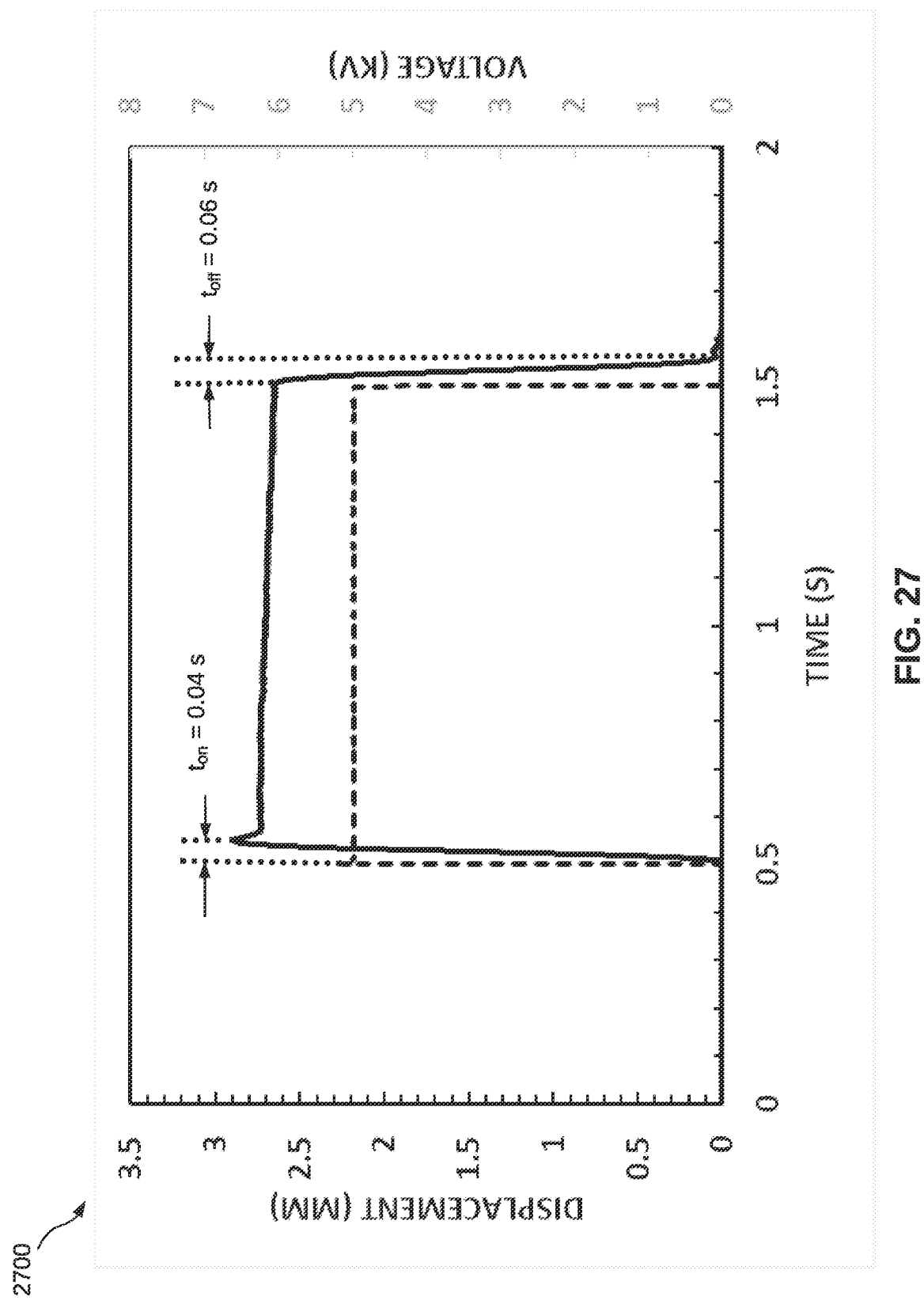
FIG. 27 shows a graph of actuator response time overlaid on the square wave input voltage applied to the actuator, in accordance with an embodiment.

FIG. 27 shows a graph of actuator response time overlaid on the square wave input voltage applied to the actuator, in accordance with an embodiment. The HASEL actuator configurations used with the embodiments described herein feature direct electrical control of the actuation with fast turn-on and turn-off times, as shown in graph 2700. Both turn-on and turn-off times are quite fast for the actuator. This dynamic performance allows for precise timing of haptic information and provides a crisp actuation feel to the user.

It is noted that, while the above described examples describe expanding actuators, contracting actuators may also be utilized in certain applications, such as for kinesthetic haptic feedback. Additionally, other actuator geometries can be made to provide optimal performance for a specific application. FIGS. 28-32 show HASEL actuators of various shapes and sizes, suitable for use as haptic actuators in accordance with certain embodiments.

Figure 28:
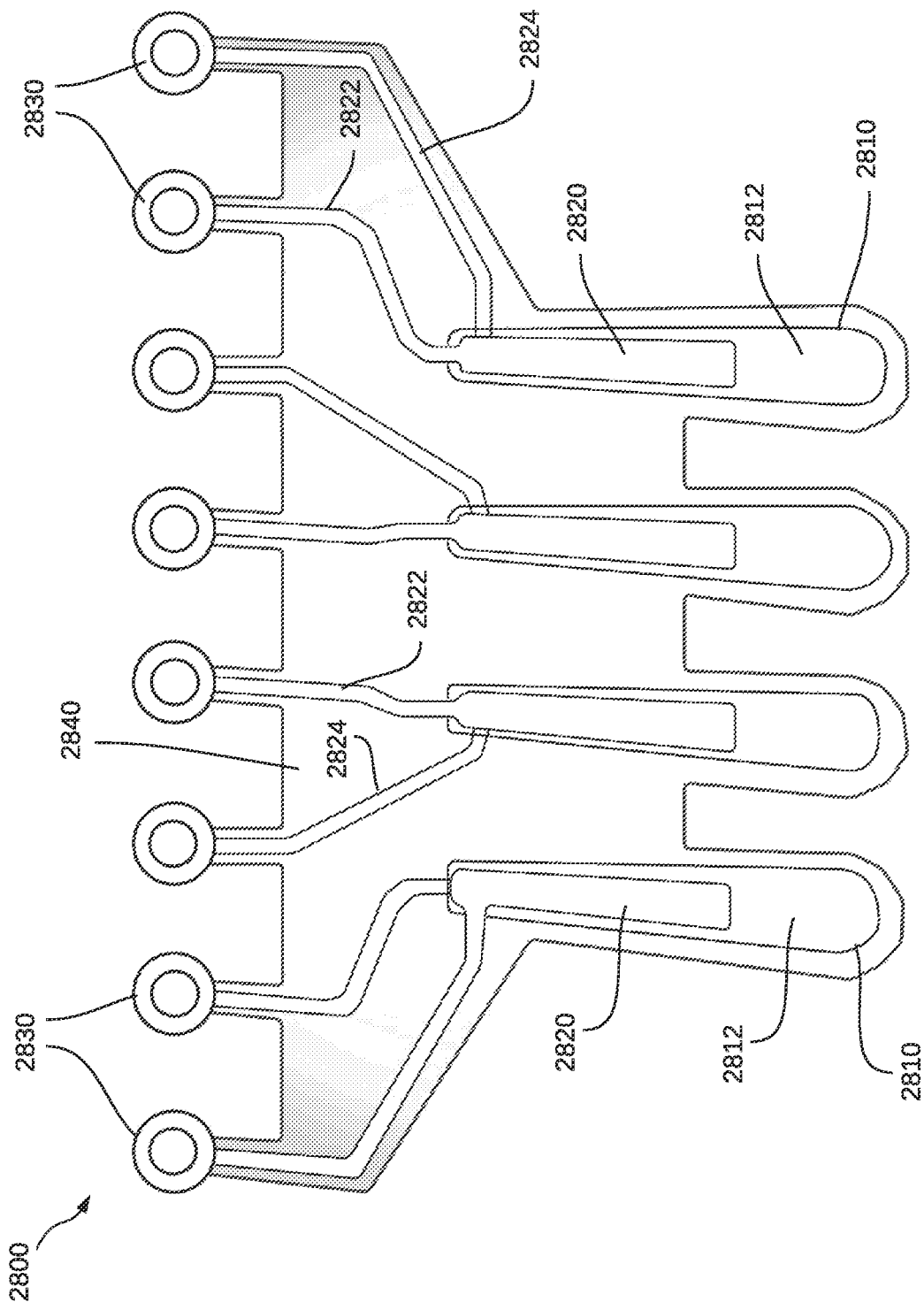
FIGS. 28-32 show HASEL actuators of various shapes and sizes, suitable for use as haptic actuators in accordance with certain embodiments.

FIG. 28 shows an actuator system 2800 including a plurality of pouches 2810, each pouch containing a fluid dielectric 2812 therein, in accordance with an embodiment. Each pouch is sandwiched between a pair of electrodes (only top electrodes 2820 are visible in FIG. 28). A top connection 2822 extends from each top electrode 2820, and a bottom connection 2824 extends from the bottom electrode (not visible in FIG. 28). Each one of top connection 2822 and bottom connection 2824 is further connected with an electrical coupling 2830, onto which an external power source may be connected to electrically address each pouch within actuator system 2800. pouches, electrodes, and connections may optionally be held together by a skirt 2840. In an embodiment, skirt 2840 may function as an encapsulating layer to provide electrical insulation, thermal insulation, cushioning, and/or electrical isolation between each actuator pouch in actuator system 2800. Actuator system 2800 may be suitable, for example, for applications requiring a plurality of actuators disposed close together, such as for access by individual fingers within a glove.

Figure 29:
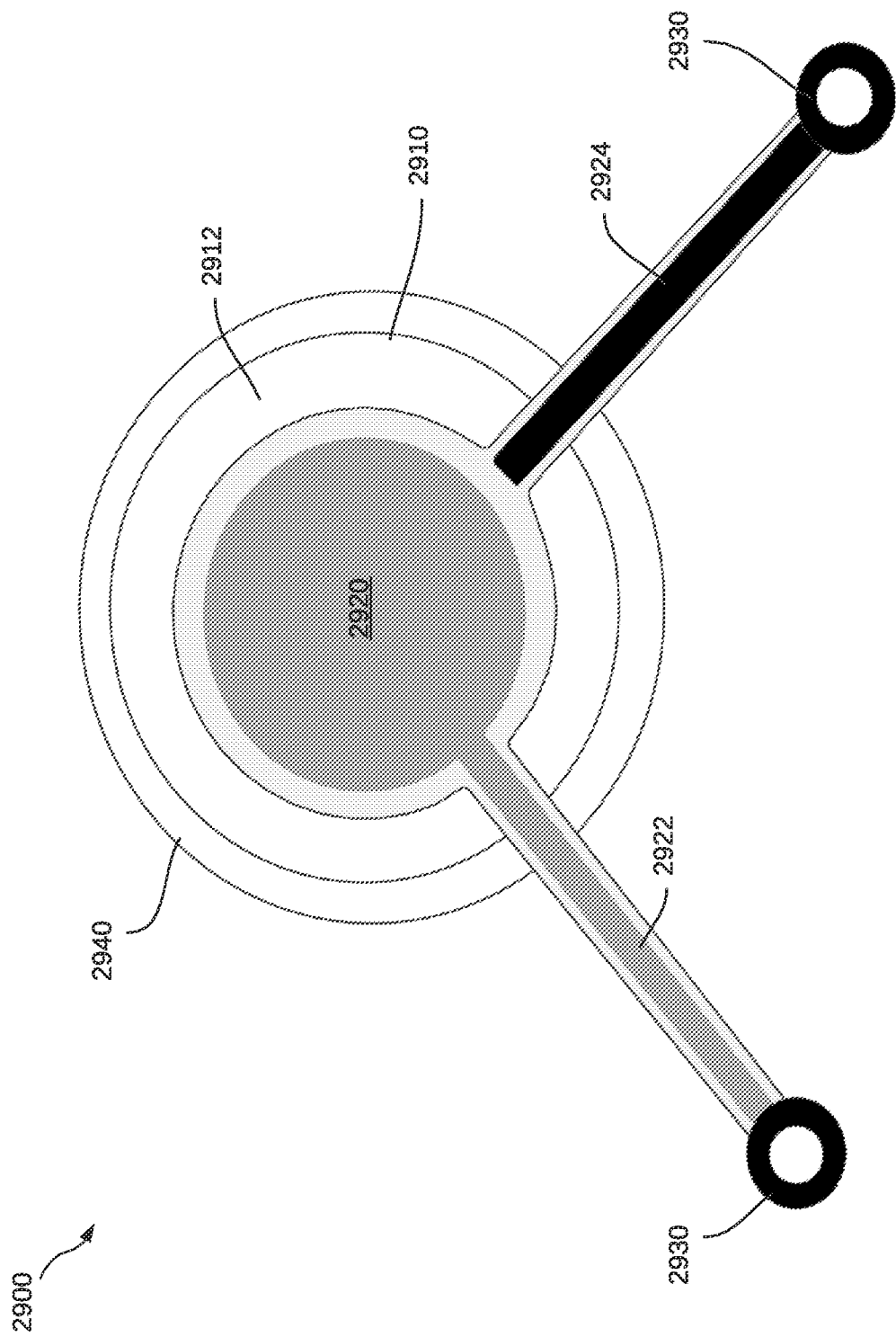

FIG. 29 shows an alternative actuator system 2900 including a pouch 2910 containing a fluid dielectric 2912 therein, in accordance with an embodiment. Pouch 2910 is sandwiched between a pair of electrodes (only top electrode 2920 is visible in FIG. 29). A top connection 2922 extends from top electrode 2820, and a bottom connection 2924 extends from the bottom electrode (not visible in FIG. 29). Top connection 2922 and bottom connection 2924 is further connected with electrical couplings 2930, provide electrical access from an external power supply, for example. As shown in FIG. 29, a skirt 2940 surrounds the pouch, electrodes, and connections. Actuator system 2900 is similar to actuator 400 shown in FIG. 4.

Figure 30:
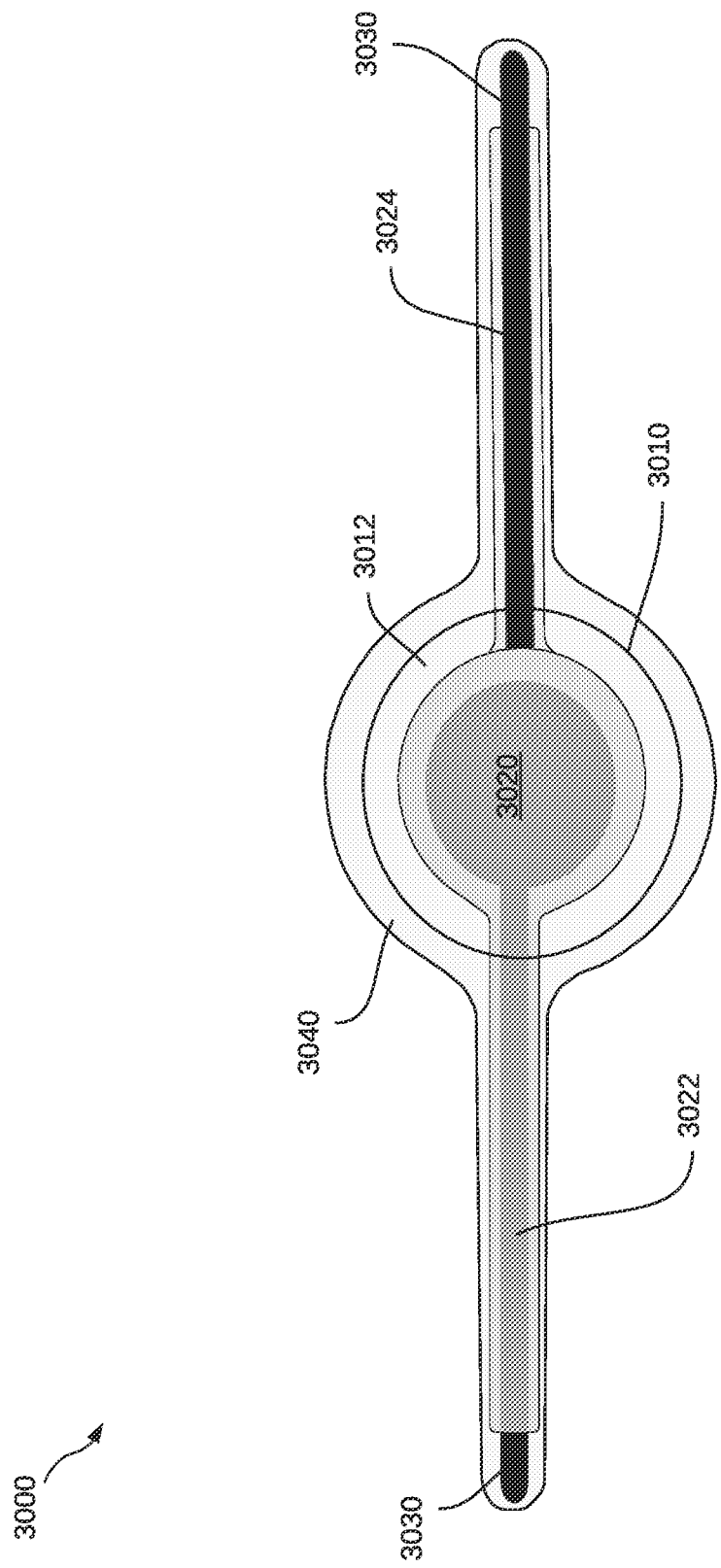

FIG. 30 illustrates still another embodiment of an actuator system 3000. As shown in FIG. 30, actuator system 3000 including a pouch 3010 containing a fluid dielectric 3012 therein. Pouch 3010 is sandwiched between a pair of electrodes (only top electrode 3020 is visible in FIG. 30). A top connection 3022 extends from top electrode 3020, and a bottom connection 3024 extends from the bottom electrode (again, not visible in FIG. 30). An end portion of each one of top connection 3022 and bottom connection 3024 is exposed to form an electrical coupling 3030, onto which an external power source may be connected to electrically address actuator system 3000. The entire actuator system, except for electrical couplings 3030, may optionally be encapsulated by a skirt 3040.

Figure 31:
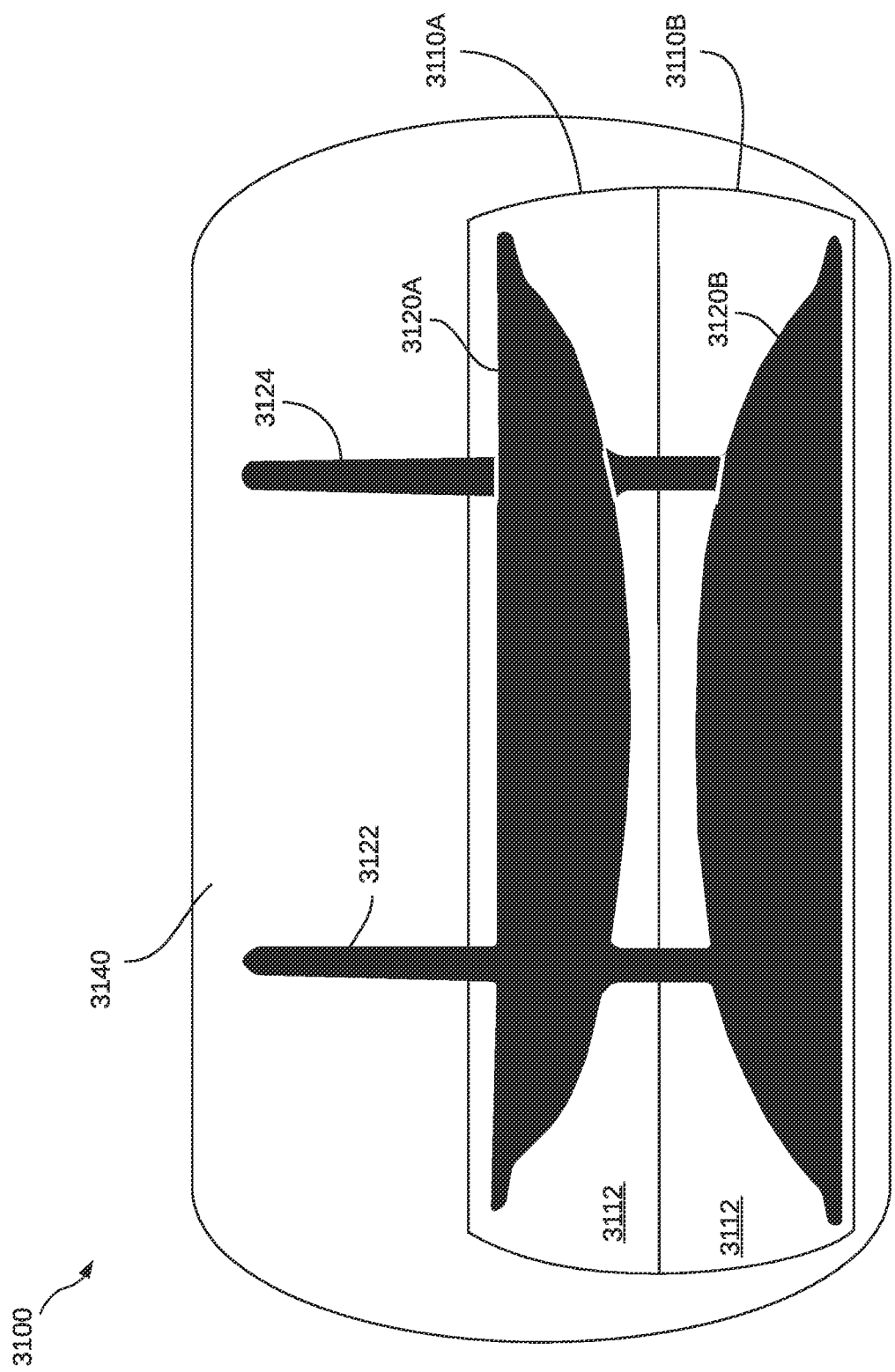

A two-pouch version of an actuator system is shown in FIG. 31, in accordance with an embodiment. As shown in FIG. 31, an actuator system 3100 includes a first pouch 3110A and a second pouch 3110B, each filled with fluid dielectric 3112. While first and second pouches 3110A and 3110B are shown adjacent to each other, the pouches may be spaced apart, in certain embodiments. Again, each pouch is sandwiched between a pair of electrodes (only top electrodes 3120A and 3120B are visible in FIG. 31). A top connection 3122 extends from each top electrode 3120, and a bottom connection 3124 extends from the bottom electrode (not visible in FIG. 31). In the embodiment illustrated in FIG. 31, top connection 3122 is shown to be connected to both of the top electrodes 3120A and 3120B, and bottom connection 3124 is connected with the bottom electrodes on both pouches. A portion of top and bottom connections 3122 and 3124 may be exposed to enable electrical coupling with an external power source. In the illustrated embodiment, actuator system 3100 further includes a skirt 3140 surrounding the entire structure, except portions of top and bottom connections 3122 and 3124 intended to provide electrical access.

Figure 32:
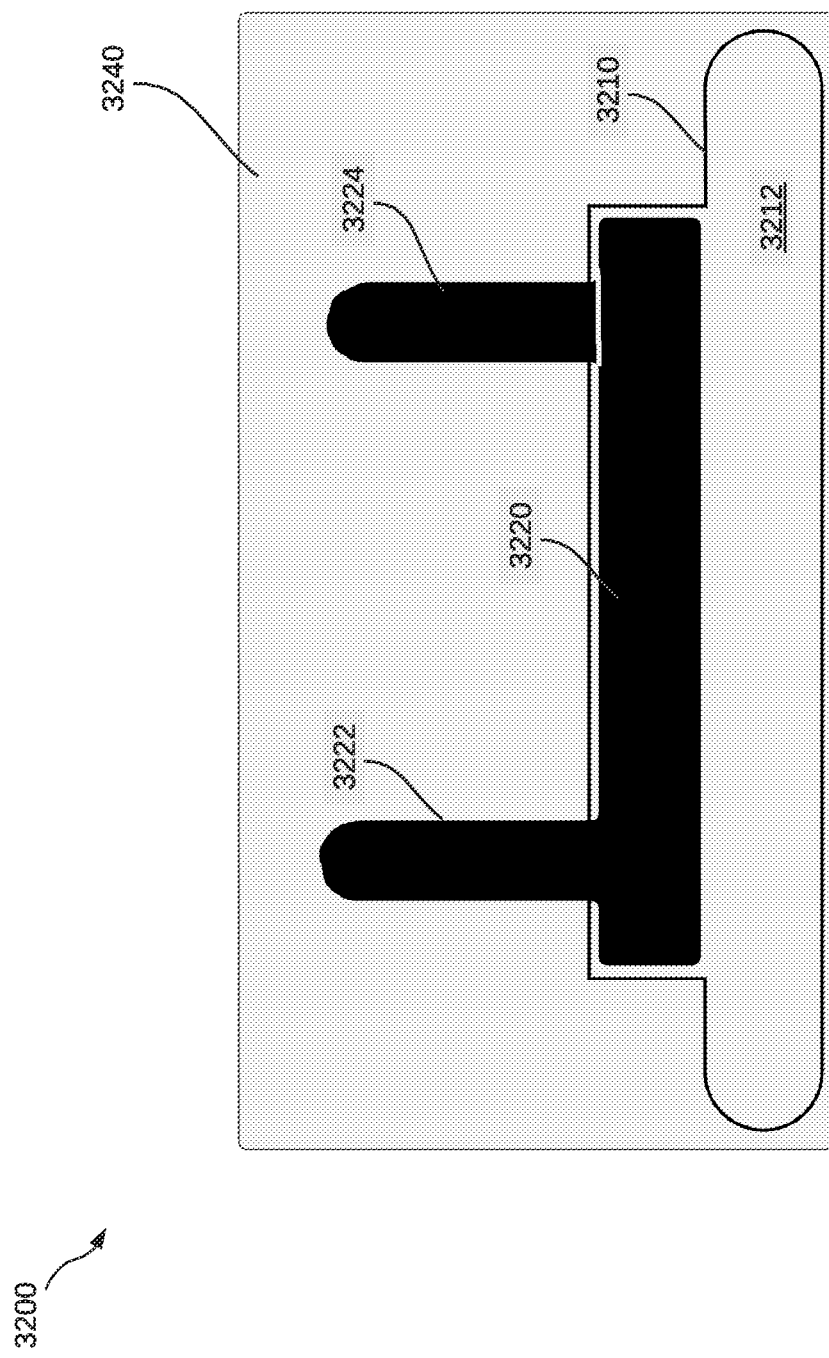

Still another exemplary embodiment of an actuator system is shown in FIG. 32. As shown in FIG. 32, an actuator system 3200 includes an elongated pouch 3210 filled with a fluid dielectric 3212. A portion of elongated pouch 3210 is sandwiched between a pair of electrodes (again, only top electrode 3220 is visible). A top connection 3222 extends from top electrode 3220, and a bottom connection 3224 extends from the bottom electrode (not visible) to enable electrical access to an external power supply. Actuator system 3200 may further includes a skirt 3240 surrounding the entire structure, except portions of top and bottom connections intended to interface with the external power supply.

While a variety of shapes of actuators are illustrated herein, still additional variations of actuator system shapes, pouch shapes, electrode shapes, and array arrangements (e.g., honeycomb array, offset row arrays, square arrays, and more) are contemplated and considered a part of the present disclosure. For instance, thinner pouch arrangements may be suitable for certain applications, while different widths or lengths of electrodes may be more suitable for certain applications. Different combinations of pouch shapes and electrode shapes may also be tailored for specific applications requiring, for example, fast switching or particularly high voltages.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The terms and expressions employed herein are used as terms and expressions of description and not of limitation, and there is no intention, in the use of such terms and expressions, of excluding any equivalents of the features shown and described or portions thereof. Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms-even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, by way of example only, the disclosure of a "protrusion" should be understood to encompass disclosure of the act of "protruding"—whether explicitly discussed or not—and, conversely, were there only disclosure of the act of "protruding", such a disclosure should be understood to encompass disclosure of a "protrusion". Such changes and alternative terms are to be understood to be explicitly included in the description.

The invention claimed is:

1. A seating system comprising:
a seat including structures for supporting a user thereon; and
a plurality of actuators, each actuator comprising:
a deformable shell defining an enclosed internal cavity,
a fluid dielectric contained within the enclosed internal cavity,
a first electrode disposed on a first side of the deformable shell, and
a second electrode disposed on a second, opposing side of the deformable shell,
wherein the plurality of actuators are integrated into the structures of the seat, and
wherein the plurality of actuators are configured for providing at least one function from among haptic feedback, seat adjustment, alert notification, vibratory signal, user input receiving, and massage function,
wherein at least one of the actuators is configured to operate as a button on demand,
wherein the at least one of the actuators is normally in a collapsed position such that a user-facing surface of the actuator is substantially flat, and
when actuated by a user, at least a portion of the at least one of the actuators is configured to expand such that the user-facing surface is raised to form the button.

2. The seating system of claim 1, wherein a portion of the plurality of actuators are enclosed within an encapsulating shell to form an encapsulated sheet of actuators.

3. The seating system of claim 2, wherein the encapsulating shell is formed of a material providing at least one of electrical insulation, thermal insulation, electrical isolation between neighboring actuators contained within the encapsulating shell, and cushioning.

4. The seating system of claim 2, wherein the at least one of the actuators is enclosed within the encapsulating shell and is configured to operate as the button on demand,
wherein the encapsulated sheet comprises the user-facing surface.

5. The seating system of claim 4, wherein the at least one of the actuators within the encapsulating shell is configured to be activatable when touched by the user.

6. The seating system of claim 4,
wherein the encapsulating sheet of actuators further contains at least one proximity sensor, and
wherein the at least one of the actuators within the encapsulating shell is in electrical communication with the at least one proximity sensor such that the at least one of the actuators within the encapsulating shell is activatable when the at least one proximity sensor senses the user within a predetermined distance from the encapsulated sheet of actuators.

7. The seating system of claim 1, further comprising a control system electrically coupled with the plurality of actuators for controlling the at least one function.

8. A seating system comprising:
a seat including structures for supporting a user thereon;
a plurality of actuators, each actuator comprising:
a deformable shell defining an enclosed internal cavity, a fluid dielectric contained within the enclosed internal cavity, a first electrode disposed on a first side of the deformable shell, and a second electrode disposed on a second, opposing side of the deformable shell; and an encapsulating shell enclosing the plurality of actuators therein to form an encapsulated sheet of actuators, wherein the plurality of actuators are configured for providing at least one function from among haptic feedback, seat adjustment, alert notification, vibratory signal, user input receiving, and massage function, wherein at least one of the actuators is configured to operate as a button on demand, wherein the at least one of the actuators is normally in a collapsed position such that a user-facing surface of the actuator is substantially flat, and when actuated by a user, at least a portion of the at least one of the actuators is configured to expand such that the user-facing surface is raised to form the button.

9. The seating system of 8, wherein the encapsulated sheet of actuators is integrated into the structures of the seat.

10. The seating system of 8, wherein the encapsulated sheet of actuators is disposed adjacent to the seat.

11. The seating system of 10, wherein the encapsulated sheet of actuators is affixed on a surface of the seat using at least one of adhesives, tape, belts, hooks, snaps, and hook-and-loop attachments.

12. The seating system of claim 11, further comprising a control system electrically coupled with the plurality of actuators for controlling the at least one function.

* * * * *